United States Patent
Takamatsu et al.

[11] Patent Number: 6,128,156
[45] Date of Patent: *Oct. 3, 2000

[54] DEVICE FOR DRIVING TAPE-LIKE RECORDING MEDIUM

[75] Inventors: Ryoji Takamatsu, Kanagawa; Takeo Kondo, Tokyo, both of Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/913,975
[22] PCT Filed: Jan. 20, 1997
[86] PCT No.: PCT/JP97/00106
  § 371 Date: Jan. 26, 1998
  § 102(e) Date: Jan. 26, 1998
[87] PCT Pub. No.: WO97/26653
  PCT Pub. Date: Jul. 24, 1997

[30] Foreign Application Priority Data

Jan. 18, 1996 [JP] Japan .................... 8-006215

[51] Int. Cl.$^7$ ................................. G11B 15/18
[52] U.S. Cl. .................................... 360/96.3
[58] Field of Search .............. 360/74.6, 74.2, 360/75, 96.3, 105, 96.2, 96.4; 242/356.7, 333.7

[56] References Cited

U.S. PATENT DOCUMENTS 4,434,442  2/1984  Kommoss et al. ............ 360/74.2
5,668,681  9/1997  Umezawa ..................... 360/96.4

Primary Examiner—Robert S. Tupper
Attorney, Agent, or Firm—Jay H. Maioli

[57] ABSTRACT

A tape-like recording medium travelling and driving apparatus includes a pair of flywheels respectively rotated and driven, a first reel turntable, and a second reel turntable, a first reel gear unit provided on the first reel turntable and rotated together with the first reel turntable, a second reel gear unit provided on the second reel turntable and rotated together with the second reel turntable, and a transmission mechanism for, transmitting a rotational drive force from any one flywheel by engaging with one of the first and second reel gear units of the pair of flywheels. The transmission mechanism comprises a mid gear to which the rotational drive force is transmitted from any one flywheel of the pair of flywheels and a rotation detecting mechanism for detecting rotation of the mid gear.

16 Claims, 19 Drawing Sheets

FIG. 8

| Position | EJECT / STOP | F-FF / R-REW | F-REW / R-FF | R-PLAY | F-PLAY |
|---|---|---|---|---|---|
| | -10° Or Larger 0° | 70.94° | 125.51° | 180.08° | 261.93° |
| COM | ▨▨▨▨▨▨▨▨▨▨▨▨▨▨▨▨▨▨ | | | | |
| P1 | ▨▨▨▨▨▨ | | | | |
| P2 | | ▨▨▨▨ | | | |
| P3 | | | ▨▨▨ | | |
| P4 | | | | ▨▨▨▨ | |
| P5 | | | | | ▨▨▨▨▨ |

DEVICE FOR DRIVING TAPE-LIKE RECORDING MEDIUM

TECHNICAL FIELD

The present invention relates to a tape-like recording medium travelling and driving apparatus suitable for use in a recording and/or reproducing apparatus such as a tape player or the like for recording and reproducing information on and from a tape-like recording medium such as a magnetic tape or the like.

BACKGROUND ART

Since a magnetic tape accommodated in a tape cassette is fixed at its end on a hub, when a tape cassette player finishes its operation for winding the tape, unless a tape traveling and driving mechanism is brought into its stop state, tape travel is stopped but some load is applied to a motor and a rotation transmission mechanism, which results in a trouble thereof, consumption of a power source battery or the like. Therefore, some tape cassette players have mechanisms for detecting completion of the tape winding operations and for automatically stopping the tape travelling and driving mechanisms.

Particularly, in consideration of a tape being wound around a capstan shaft in an auto reverse tape cassette player or the like, it is desirable to always detect a tape end at a tape takeup side in both of a forward travel direction and a reverse travel direction, to thereby control a switching of the tape travelling and driving mechanism.

For this end, a conventional auto reverse tape cassette player is arranged so as to have a detecting means provided at a takeup reel turntable and a supply reel turntable, regardless of whether a tape travel direction is a forward travel direction or a reverse travel direction, and the detecting means on the takeup side and the supply side respectively detect a tape end upon a forward tape travel and a reverse tape travel to thereby control the switching of the tape travelling and driving mechanism.

Since the auto reverse tape cassette player has the tape end detecting means at both of the tape takeup reel stand and the tape supply reel turntable, a reflection plate and a sensor are required for each of the tape end detecting means. Therefore, an arrangement thereof is complicated, and a means for assembling the auto reverse tape cassette player is required. Further, since two photo interrupters which are expensive as sensors are employed, a manufacturing cost thereof is increased.

Since each of the reel turntables has a small diameter and the reflection plate of the tape end detecting means attached thereto is also formed so as to have a small diameter, a relative relationship between the reflection plate and the photo interrupter serving as a sensor is easily fluctuated, which is likely to lead to malfunctions.

DISCLOSURE OF THE INVENTION

In view of such aspects, it is an object of the present invention to provide a tape-like recording medium travelling and driving apparatus which, with one detecting means, can detect a travel of a tape-like recording medium in both of a forward travel direction and a reverse travel direction, i.e., detect both direction rotation of the takeup reel turntable and thereby achieves reduction of manufacturing costs and improvement of reliability.

A tape-like recording medium travelling and driving apparatus according to the present invention includes a pair of flywheels respectively rotated and driven, a first reel turntable, and a second reel turntable, a first reel gear unit provided on the first reel turntable and rotated together with the first reel turntable, a second reel gear unit provided on the second reel turntable and rotated together with the second reel turntable, and a transmission mechanism for, by engaging any one flywheel of the pair of flywheels with one of the first and second reel gear units, transmitting a rotational drive force therefrom. The transmission mechanism comprises a mid gear to which the rotational drive force is transmitted from any one flywheel of the pair of flywheels and a rotation detecting mechanism for detecting rotation of the mid gear to detect the travelling of the tape-like recording medium.

According to the travelling and driving apparatus of the present invention, an operation state of the transmission mechanism is switched based on a detection output from the rotation detecting mechanism.

The travelling and driving apparatus of the present invention further includes a travel mode switching mechanism and arranged in that the mode switching mechanism switches the operation state of the transmission mechanism to transmit the rotational drive force from the flywheel to any one of the first and second reel gear units and swings the mid gear to transmit a rotational drive force from the other of the flywheels to the rotational drive force from one of the flywheels.

The travelling and driving apparatus of the present invention further includes a drive mechanism for driving the mode switching mechanism.

The mode switching mechanism further includes a gear rotated by the drive mechanism and a further rotation detecting mechanism for detecting rotation of the gear.

The mode switching mechanism further includes a mode changeover lever for switching the operation of the transmission mechanism driven by the gear and for swinging the mid gear.

The travelling and driving apparatus of the present invention further includes a loading and ejecting mechanism for loading a tape-like recording medium on the apparatus and ejecting the same from the apparatus. The gear is rotated by one-direction rotation of a drive source of the drive mechanism and the loading and ejecting mechanism is driven by other direction rotation of the drive source of the drive mechanism.

A recording and/or reproducing apparatus employing a tape cassette according to the present invention includes a pair of flywheels respectively rotated, a first reel turntable engaged with one reel hub of a pair of reel hubs of a tape cassette, a second reel turntable engaged with the other reel hub of the pair of reel hubs of the tape cassette, a first reel gear unit provided at the first reel turntable and rotated together with the first reel turntable, a second reel gear unit provided at the second reel turntable and rotated together with the second reel turntable, a head which records an information signal on a tape-like recording medium accommodated in the tape cassette or reads an information signal recorded on the tape-like recording medium and which is moved between its standby position and its recording or reading position where it records an information data on the tape-like recording medium or reads an information data recorded on the tape-like recording medium, and a transmission mechanism which, by being engaged with any one reel gear unit of the first and second reel gear units, transmits a rotational drive force from any one flywheel of the pair of flywheels and which includes a mid gear to which the rotational drive force from any one flywheel of the pair of flywheels is transmitted and which includes a rotation detecting mechanism to detect a rotation of the mid gear.

According to the recording and/or reproducing apparatus of the present invention, an operation state of the transmission mechanism is switched based on a detection output from the rotation detecting mechanism.

According to the recording and/or reproducing apparatus of the present invention, an operation state of the transmission mechanism is switched based on a detection output from the rotation detecting mechanism and on an output from the head.

The recording and/or reproducing apparatus according to the present invention further includes a travel mode switching mechanism and arranged in that the mode switching mechanism switches the operation state of the transmission mechanism to transmit the rotational drive force from the flywheel to any one of the first and second reel gear units and swings the mid gear to transmit a rotational drive force from the other of the flywheels from the rotational drive force from one of the flywheels.

According to the recording and/or reproducing apparatus of the present invention, the mode switching mechanism moves the head between the standby position and the recording or reproduction position in response to the switching of the operation state of the transmission mechanism.

The recording and/or reproducing apparatus according to the present invention further includes a drive mechanism for driving the mode switching mechanism.

According to the recording and/or reproducing apparatus of the present invention, the mode switching mechanism includes a gear rotated by the drive mechanism and a further rotation detecting mechanism for detecting rotation of the gear.

The recording and/or reproducing apparatus according to the present invention further includes a mode changeover lever for switching the operation of the transmission mechanism driven by the gear and for swinging the mid gear.

The recording and/or reproducing apparatus according to the present invention further includes a loading and ejecting mechanism for loading a tape-like recording medium onto the apparatus and ejecting the same from the apparatus, wherein the gear is rotated by one-direction rotation of a drive source of the drive mechanism and the loading and ejecting mechanism is driven by other-direction rotation of the drive source of the drive mechanism.

According to the tape-like recording medium travelling and driving apparatus of the present invention, since one rotation detecting mechanism can detect rotations of the first and second reel turntables to detect the travel of the tape-like recording medium, it is possible to reduce the costs and to improve the operability.

Since the operation state of each of the mechanisms can be switched based on the detection output from the rotation detecting mechanism, the operability can be improved.

BRIEF DESCRIPTION OF DRAWINGS

FIG. 8 is a code table of a rotary switch gear shown in FIG. 6;

BEST MODE FOR CARRYING OUT THE INVENTION

A tape-like recording medium travelling and driving apparatus according to the present invention will hereinafter be described with reference to the accompanying drawings showing an embodiment in which the present invention is applied to a tape cassette player for reading and reproducing information recorded on a magnetic tape accommodated in a tape cassette.

Figure 1:
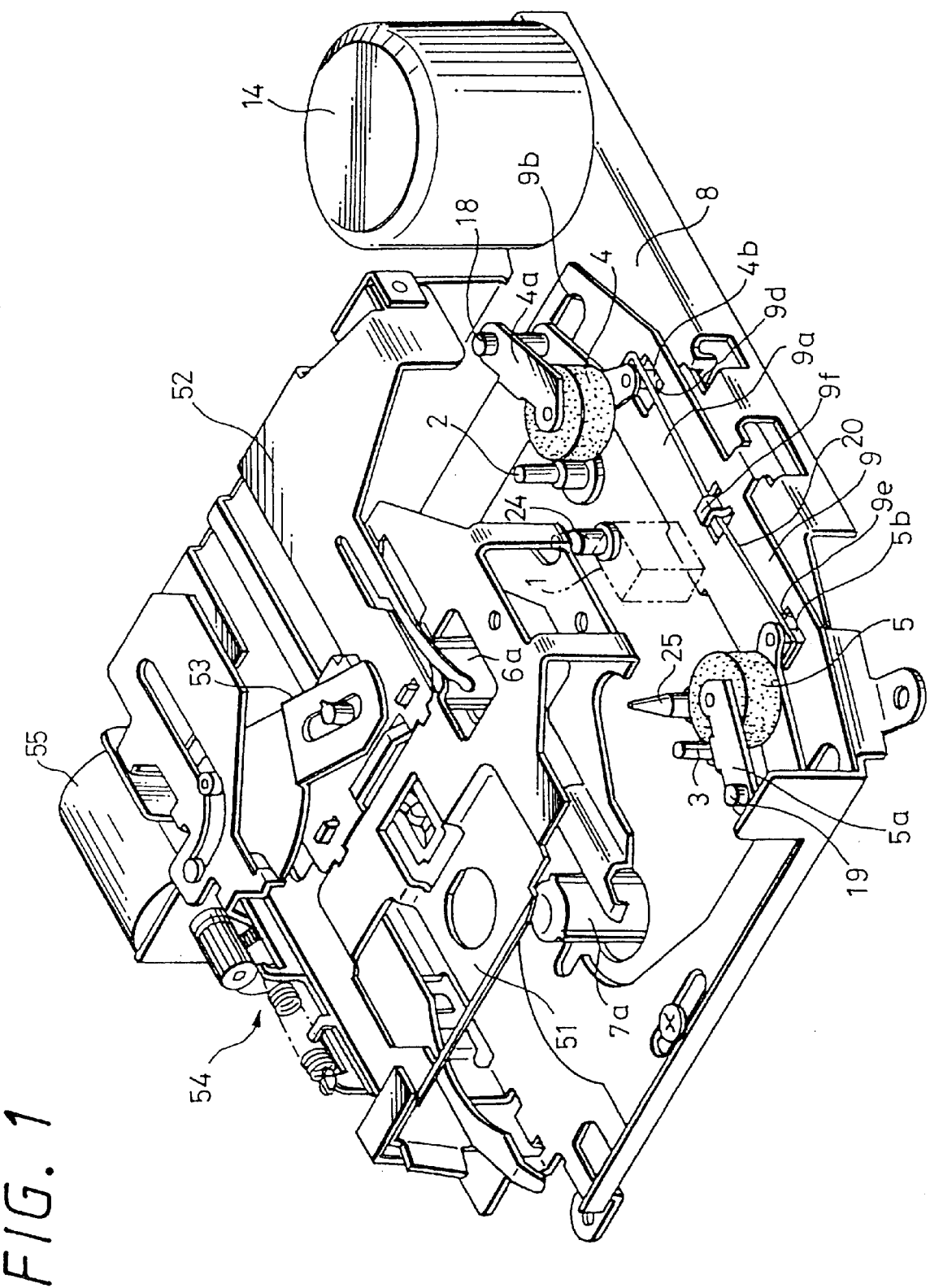
FIG. 1 is a perspective view of an example of a tape player to which the present invention is applied.
Figure 2:
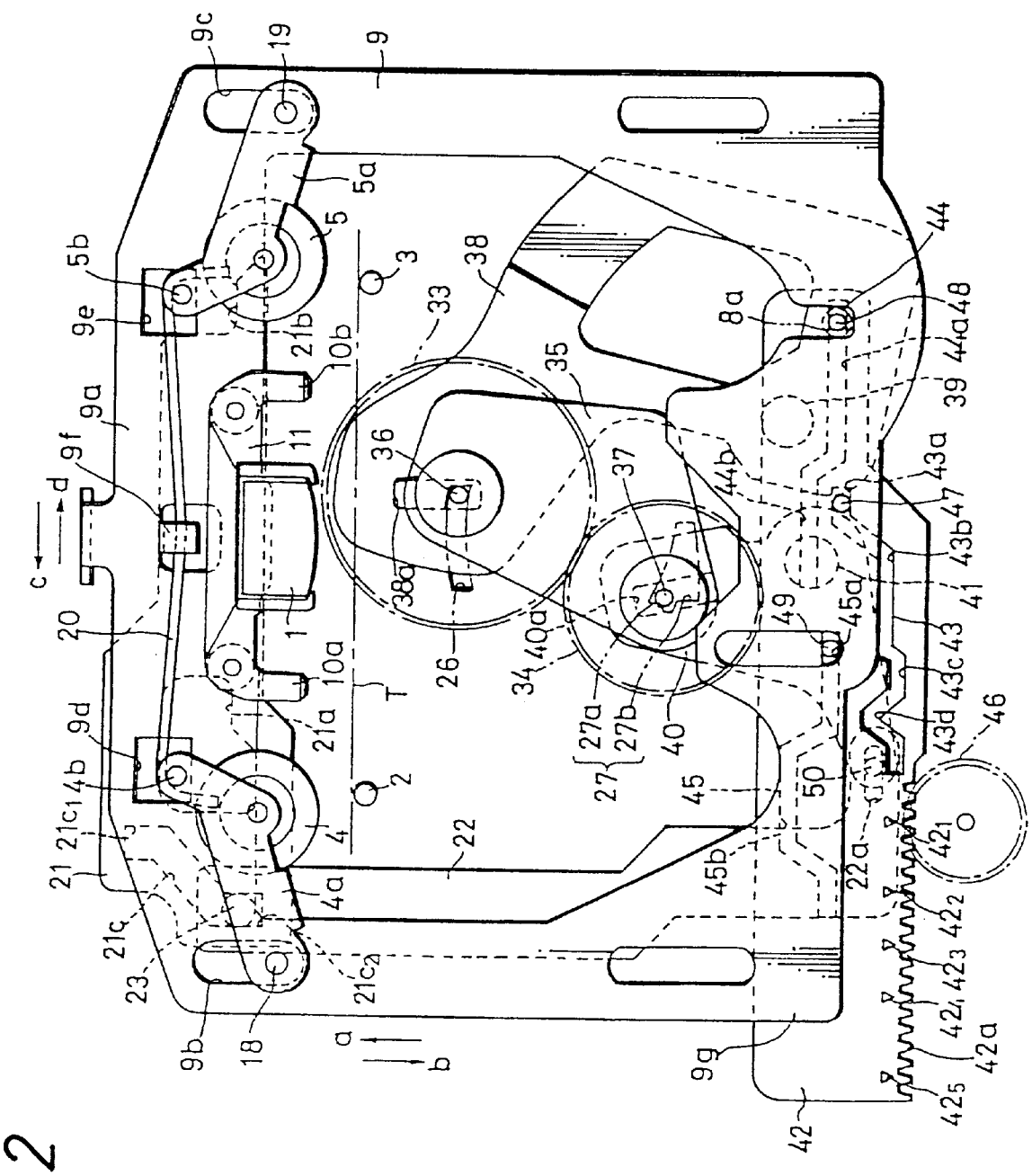
FIG. 2 is a plan view showing an eject/stop state of a changeover mechanism unit of the tape player shown in FIG. 1.
Figure 3:
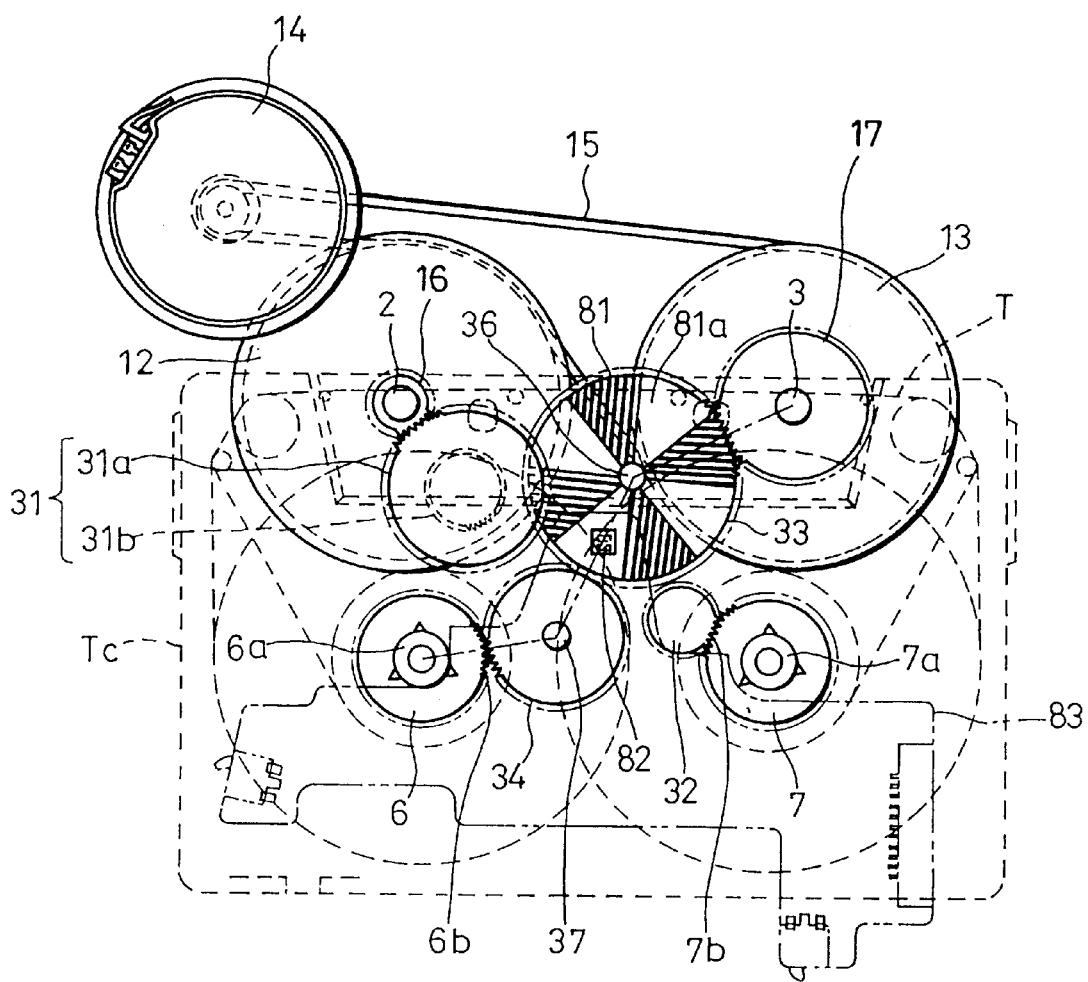
FIG. 3 is a plan view showing an eject/stop state of a tape travel mechanism unit of the tape player shown in FIG. 1.

In FIGS. 1 to 3, reference numeral 1 depicts a magnetic head. Reference numerals 2, 3 depict a pair of capstans. Reference numerals 4, 5 depicts a pair of pinch rollers. Reference numerals 6, 7 depict a pair of reel turntables having reel drive shafts 6a, 7a projectingly provided at their centers and gears 6b, 7b provided at their outer peripheries. As shown in FIGS. 1, 2, a quadrilateral frame-shaped head base 9 is attached to a surface side of a mechanical chassis 8 so as to surround a portion where the capstans 2, 3 and the reel drive shafts 6a, 7a are disposed and so as to be slid in the forward and backward directions, i.e., in both of the direction (forward direction) shown by an arrow a in FIG. 2 and the direction (backward direction) shown by an arrow b therein. The magnetic head 1 is attached to a front side portion 9a of the quadrilateral frame-shaped had base 9 through a supporting frame 11 having tape guides 10a, 10b at its both side portions.

The capstans 2, 3 are pivotally supported by the mechanical chassis 8 and, as shown in FIG. 3, also respectively attached with fly wheels 12, 13 serving also as reduction pulleys around which a belt 15 used for transmitting rotation of a capstan motor 14 is wound and coaxially attached with gears 16, 17, respectively. The gear 16 of the takeup side (hereinafter referred to as F side) capstan 2 is a small-diameter gear fixed on the fly wheel 12, while the gear 17 of the supply side (hereinafter referred to as R side) capstan 3 is a large-diameter gear fitted to the fly wheel 13 through a slip mechanism (not shown).

As shown in FIGS. 1, 2, the pinch rollers 4, 5 are pivotally supported by pinch roller levers 4a, 5a, respectively. The pinch roller levers 4a, 4b are also rotatably supported by shafts 18, 19 planted on the mechanical chassis 8 through long apertures 9b, 9c, which are long in the front and rear directions, formed through both side portions of the front side portion 9a of the head base 9 so as to correspond to the F-side capstan 2 and the R-side capstan 3, respectively. Stoppers 4b, 5b are projectingly provided at free ends of the pinch roller levers 4a, 5a and inserted through window apertures 9d, 9e formed through the front side portion 9a of the head base 9, respectively. The stoppers 4b, 5b are engaged with both end portions of a stretched spring member 20 engaged at its center portion with an engagement piece 9f formed by cutting a part at a center portion of the front side portion 9a of the head base 9 to bent it upward. Thus, a spring force of the spring member 20 rotates and biases the pinch roller levers 4a, 5a toward the capstans 2, 3, respectively.

As shown in FIG. 2, a pinch roller changeover lever (hereinafter referred to as a pinch changeover lever) 21 positioned below the front side portion 9a of the head base 9 and slid on the mechanical chassis 8 in the left and right direction corresponds to the stoppers 4b, 5b of the respective pinch roller lever 4a, 5a. The pinch changeover lever 21 has engagement and stopper edge portions 21a, 21b formed so as to be stopped by and engaged with the stoppers 4b, 5b when being slidably moved and brought in contact therewith, respectively, and also has at its one side portion a cam aperture 21c which is long in the front and rear direction and bent such that its front and rear end portions are not aligned on a line. A front end portion 21c₁ of the cam aperture 21c is located on an inner side, and a rear end portion 21c₂ is located on an outer side.

An engagement piece 23 projectingly provided at a front end of an interlock lever 22 slidably moved on the mechanical chassis 8 in the front and rear direction is engaged with the cam aperture 21c of the pinch change lever 21. When the interlock lever 22 is slid in the front direction, the engagement piece 23 is moved forward (in the direction shown in by an arrow a) in the cam aperture 21c and then engaged with the front end portion 21c₁ located on the inner side. As a result, the pinch changeover lever 21 is slid outward (in the direction shown by an arrow c) and then the engagement and stopper edge portion 21a corresponds to the stopper 4b of the pinch roller lever 4a. When the interlock lever 22 is slid backward (in the direction shown by an arrow b), the engagement piece 23 is moved to and engaged with the rear end portion 21c₂ of the cam aperture 21c. As a result, the pinch changeover lever 21 is slid inward (in the direction shown by an arrow d) and then the engagement and stopper edge portion 21b corresponds to the stopper 5b.

Guide posts 24, 25 for positioning a tape cassette Tc are planted in the vicinity of the capstans 2, 3 located on the surface side of the mechanism chassis 8.

Figure 4:
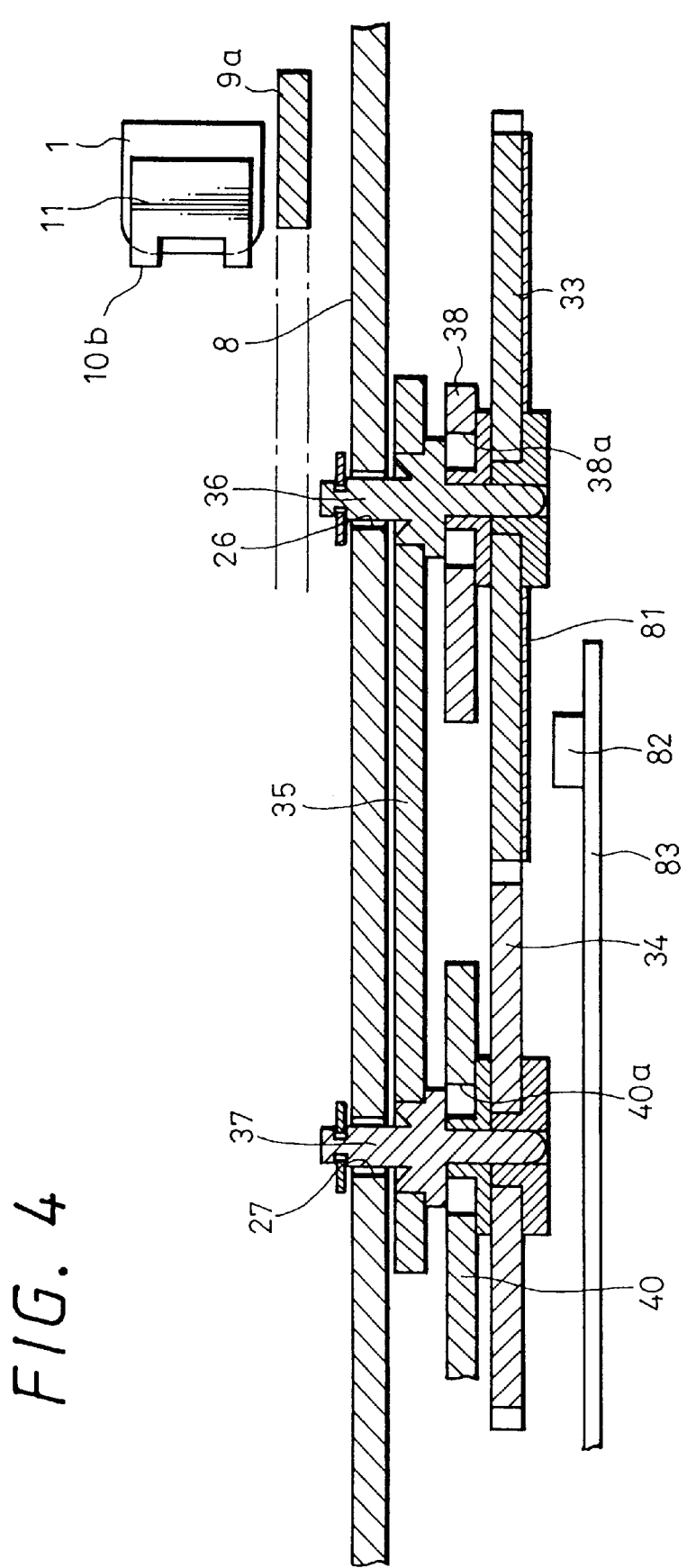
FIG. 4 is a enlarged, cross-sectional view showing a part thereof shown in FIG. 2.
Figure 5:
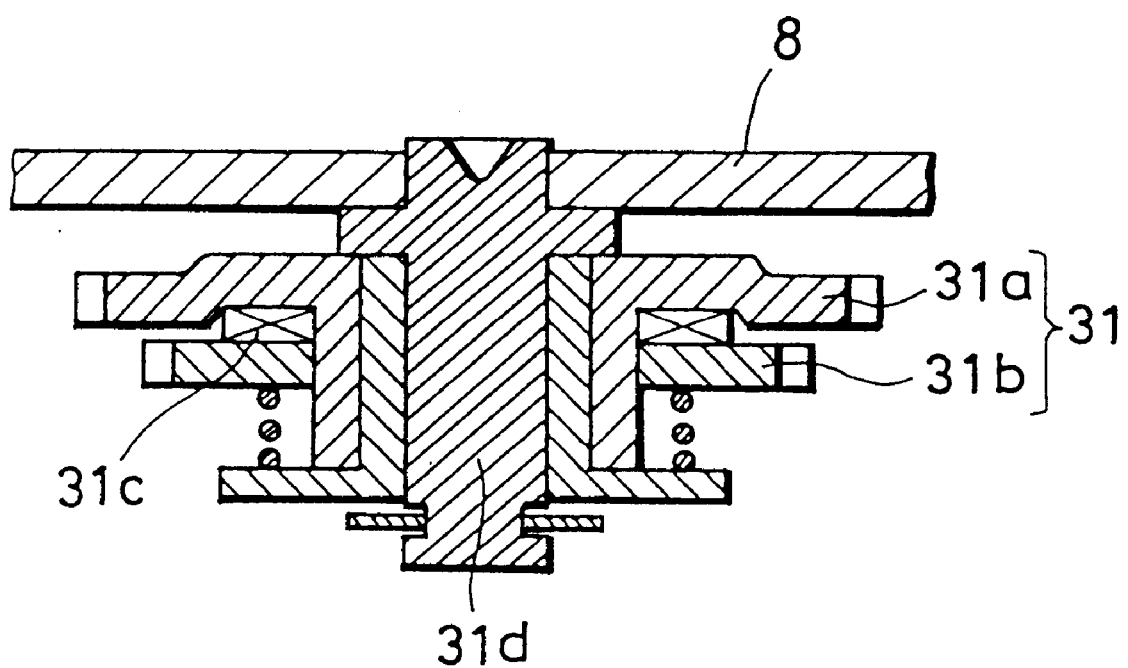
FIG. 5 is a cross-sectional view of a play gear portion shown in FIG. 3.

As shown in FIGS. 3, 4 and 5, the gear 16 of the F-side capstan 2 is engaged with a large gear 31a of a play gear 31 formed by jointing the large gear 31a and a small gear 31b by a common shaft 31d through a slip mechanism 31c. The gear 7b of the R-side reel turntable 7 is engaged with an R-side fixed gear 32.

As shown in FIGS. 2, 4, a first relay gear 33 for selectively meshing with the gear 17 of the R-side capstan 3 and the small gear 31b of the play gear 31 and a second relay gear 34 for selectively meshing with the gear 6b of the F-side reel turntable 6 and the R-side fixed gear 32 are respectively rotatably supported by shafts 36, 37 on a gear lever 35 with meshing with each other, thereby forming a switch relay rotating member. The shafts 36, 37 are engaged with and movably supported by a first guide aperture 26 and a second guide aperture 27 formed through the mechanical chassis 8, respectively.

As shown in FIG. 2, the first and second guide apertures 26, 27 formed through the mechanical chassis 8 have arc shapes opposed to each other. The second guide aperture 27 which the shaft 36 of the first relay gear 33 is engaged with and supported by is formed of a first arc-shaped aperture portion 27a employing the R-side capstan 3 side edge portion of the first guide aperture 26, with which the shaft 36 of the first relay gear 33 is engaged, as a center of the arc and a second arc-shaped aperture portion 27b employing the F-side capstan 2 side edge portion thereof as a center of the arc.

As shown in FIG. 2, the shaft 36 of the first relay gear 33 side is engaged with a long aperture 38a which is long in the forward and backward direction and formed through one end portion of a first change lever 38. The first change lever 38 is pivotally fitted at its other end portion to a rear surface side of a rear portion of the mechanical chassis 8 by a fulcrum shaft 39.

The shaft 37 on the second relay gear 34 side is engaged with a long aperture 40a which is long in the forward and backward direction and formed through one end portion of a second change lever 40. The second change lever 40 is pivotally fitted at its middle portion to the rear surface side of the rear portion of the mechanical chassis 8 by a fulcrum shaft 41.

On a front surface side of the rear portion of the mechanical chassis 8, a mode lever 42 is disposed below a rear side 9g of the head base 9 so as to be movable in the traverse direction. A rack 42a is formed on a rear edge portion of the mode lever 42. A head base opening cam aperture 43, a first change lever operating cam aperture 44 and a second change lever operating cam aperture 45 are formed through a middle surface portion thereof.

The mode lever 42 is engaged at its rack 42a with a rotary switch gear 46 for switching a tape drive mode to each of modes described later on, thereby a tape drive mode changeover mechanism being formed. The mode lever is moved by a predetermined length by a predetermined rotation of the rotary switch gear 46. An operating pin 47 projectingly provided at the rear side portion 9g of the head base 9 is engaged with the head base operating cam aperture 43. Operating pins 48, 49 projectingly provided at the first and second change levers 38, 40 are engaged with the first and second change lever operating cam apertures 44, 45 through an aperture 8a bored through the mechanical chassis 8.

An interlock pin 50 is projectingly provided at the other end portion of the second change lever 40, being engaged, on the rear surface side of the rear portion of the mechanical chassis 8, with an engagement aperture 22a formed through a rear end portion of the interlock lever 22 so as to be long in the traverse direction.

In FIG. 1, reference numeral 51 depicts a cassette housing for holding a tape cassette inserted thereinto. The cassette housing 51 is lifted up and down by a housing hanger 52 supporting the same relative to a portion where the capstans 2, 3, the reel drive shafts 6a, 7a and the guide posts 24, 25 on the front surface side of the mechanical chassis 8 are disposed, i.e., relative to a side of the tape travelling and driving mechanism. The cassette housing 51 is provided with a lead-in lever mechanism 53 for loading and unloading a tape cassette thereonto and therefrom in an interlocking operation with the lifting-up and lowering operations thereof. Reference numeral 54 depicts a loading mechanism for operating the housing hanger 52 and the lead-in lever mechanism 53. Reference numeral 55 depicts a control motor serving as a drive source for the loading mechanism 53 and the rotary switch gear 46.

Figure 6:
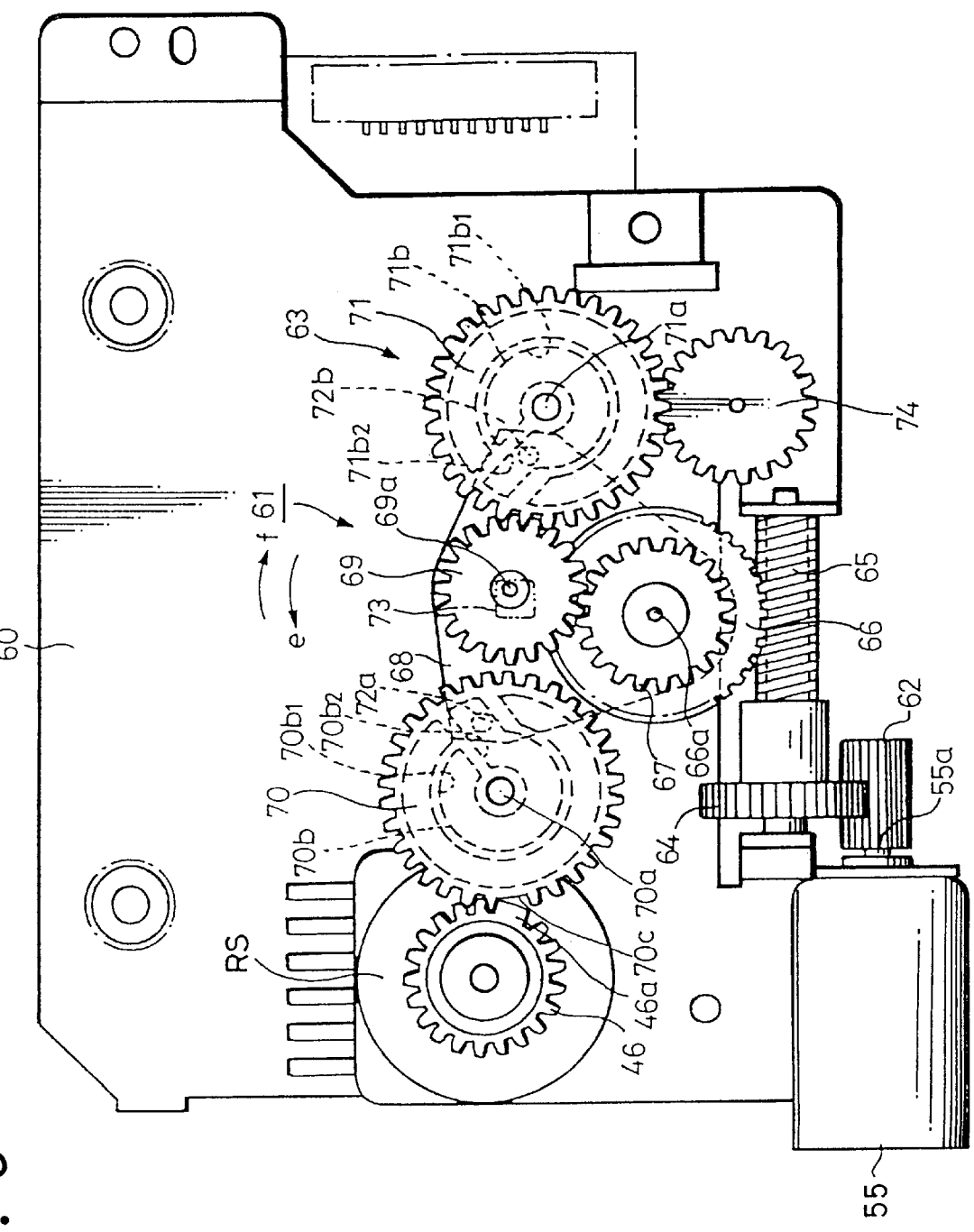
FIG. 6 is a plan view showing a control mechanism unit of the tape player shown in FIG. 1.
Figure 7:
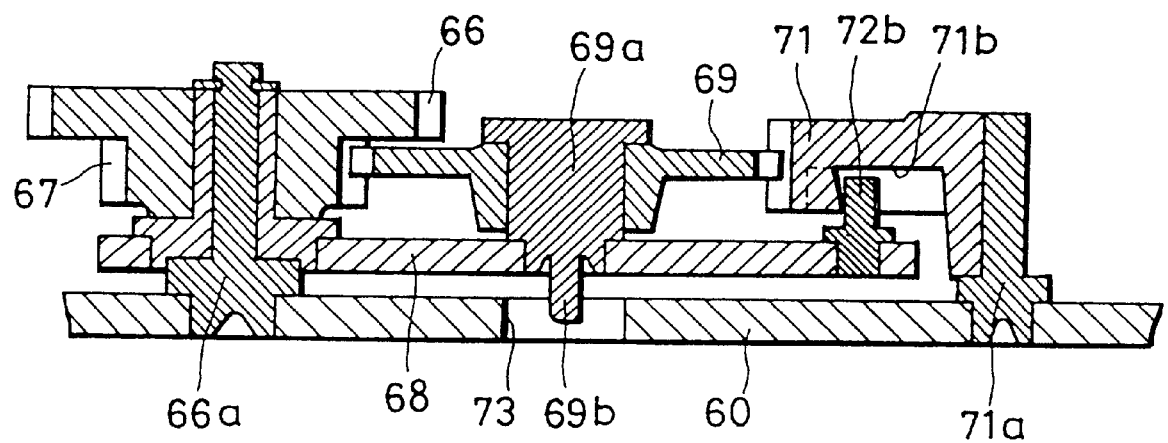
FIG. 7 is a cross-sectional view showing a drive gear unit shown in FIG. 6.

As shown in FIGS. 6 and 7, a drive mechanism 61 is disposed on a base plate 60 on the rear surface side of the mechanical chassis 8.

The drive mechanism 61 is interlocked with the control motor 55 for driving the rotary switch gear 46 and the loading mechanism 54. A motor gear 62 is pressed and fixed on a shaft 55a of the motor 55. The drive mechanism is formed of a group of drive gears 63 driven through the motor gear 62. The group of drive gears 63 are arranged as follows.

Specifically, a worm gear 65 is coaxially fixed on a intermediate gear 64 engaged with the motor gear 62. A worm wheel 66 engaged with the worm gear 65 is pivotally fitted to the base plate 60 through a shaft 66a. The worm wheel 66 is coaxially formed integrally with an interlocking gear 67. A rotation lever 68 is rotatably supported at the shaft 66a of the worm wheel 66, and a changeover gear 69 engaged with the interlocking gear 67 is pivotally supported on the rotation lever 68 by a shaft 69a.

A switch gear 70 engaged with the rotary switch gear 46 and a loading gear 71, which are located across the changeover gear 69, are rotatably and pivotally fitted to the base plate 60 by shafts 70a, 71a, respectively. Guide grooves 70b, 71b are formed on lower surface sides of both of the gears 70, 71, respectively. The guide grooves 70b, 71b are formed of circular groove portions $70b_1$, $71b_1$ employing the shafts 70a, 71a as centers of the circles and relief groove portions $70b_2$, $71b_2$ bent toward outer periphery direction from one end portions of the circular groove portions $70b_1$, $71b_1$, respectively. Engagement pins 72a, 72b projectingly provided both side portions of the rotation lever 68 across the changeover gear 69 are engaged with the guide grooves 70b, 71b of both of the gears 70, 71, respectively. A tip end portion 69b of the shaft 69a of the changeover gear 69 is opposed to a window aperture 73 formed through the base plate 60.

Of the group of drive gears 63 thus arranged, the switch gear 70 has a tooth lacking portion 70c at a part of teeth thereof meshing with the rotary switch gear 46, and the rotary switch gear 46 has a continuous tooth portion 46a formed so as to correspond to the tooth lacking portion 70c. A position where the switch gear 70 and the rotary switch gear 46 mesh with each other is accurately determined thereby.

The loading gear 71 meshes with a loading drive gear 74 pivotally fitted to the base plate 60. The loading drive gear 74 is engaged with a rack of a loading lever, not shown, of the above loading mechanism 54.

The worm wheel 66 of the group of drive gears 63 thus arranged is rotated through the worm gear 65 by rotation of the control motor 55. The changeover gear 69 engaged with the interlocking gear 67 fixed on the worm wheel 66 is moved toward the switch gear 70 or the loading gear 71 in accordance with the rotational direction of the interlocking gear 67 together with the rotation lever 68 and then engaged therewith, thereby transmits rotation of the interlocking gear 67 to the switch gear 70 or the loading gear 71.

For example, in a state shown in FIG. 6, when the worm wheel 66 and the interlocking gear 67 are rotated counterclockwise, these rotations permit the changeover gear 69 to be moved in the left direction (the direction shown by an arrow e) with being rotated clockwise and also permit the rotation lever 68 to be moved in the left direction (the direction shown by the arrow e) together with the changeover gear. The changeover gear 69 is engaged with the switch gear 70 located on the left side. In this state, one engagement pin of the rotation lever 68, i.e., the engagement pin 72a engaged with the guide groove 70b of the switch gear 70 is moved from the relief groove portion $70b_2$ of the guide groove 70b to face the circular groove portion $70b_1$ thereof. Thus, the switch gear 70 is brought into its rotatable state. The rotation of the changeover gear 69 is transmitted to the switch gear. The switch gear is rotated, and consequently the rotary switch gear 46 engaged with the switch gear 70 is rotated.

Since the rotation lever 68 is located at a position where it has been rotated in the left direction (the direction shown by the arrow e) in this state, the other engagement pin, i.e., the engagement pin 72b engaged with the guide groove 71b of the loading gear 71 is inserted into and engaged with the relief groove portion $71b_2$ of the guide groove 71. Thus, the rotation of the loading gear 71 is stopped, and the loading drive gear 74 is not rotated to thereby keep the loading mechanism 54 in its stop state.

After, as described above, the loading switch gear 46 is rotated by transmitting the rotation of the changeover gear 69 to the switch gear 70 and hence a rotary switch RS connected to the rotary switch gear 46 is rotated to a predetermined position, the control motor 55 is rotated in the reverse direction. Then, the changeover gear 69 is reversely rotated through the interlocking gear 67 and then moved toward the loading gear 71. In this state, since the one engagement pin 72a of the rotation lever 68 is slidably brought in contact with the circular groove portion $70b_1$ of the guide groove 70b of the switch gear 70, the rotation lever 68 is prevented from being moved and hence the changeover gear 69 transmits the reverse rotation of the interlocking gear 67 to the switch gear 70 with meshing with the switch gear 70. Thus, the rotary switch gear 46 is reversely rotated.

When the switch gear 70 is reversely rotated and then returned to its original position, the relief groove portion $71b_2$ of the guide groove 70b of the switch 70 corresponds to the one engagement pin 72a of the rotation lever 68. As a result, since the engagement of the engagement pin 72a with the switch gear 70 is released, the rotation lever 68 becomes capable of being moved and hence the reverse rotation gear 67 permits the rotation lever 68 to be rotated toward the loading gear 71 (the direction shown by an arrow f) together with the changeover gear 69 brought in its state in which it can be moved toward the loading gear 71.

As a result, as shown in FIG. 6, the changeover gear 69 becomes engaged with the loading gear 71. The one engagement pin 72a of the rotation lever 68 is inserted into and engaged with the relief groove portion $70b_2$ of the guide groove 70b of the switch gear 70, and the other engagement pin 72b is moved from the relief groove portion $71b_2$ of the guide groove 71b of the loading gear 71 to the circular groove portion $71b_1$ thereof.

When the control motor 55 is rotated in this state, the rotation is transmitted through the worm wheel 66, the interlocking gear 67 and the changeover gear 69 to the loading gear 71 and then the loading gear is rotated with the other engagement pin 72b of the rotation lever 68 being slidably in contact with the circular groove portion 71b of the guide groove 71b. On the other hand, when the one engagement pin 72a of the rotation lever 68 is inserted into and engaged with the relief groove portion 70b$_2$ of the guide groove 70b, the rotation of the switch gear 70 is stopped and hence the rotary switch gear 46 is brought into its stop state.

In this state, the rotation of the loading gear 71 is transmitted to the loading drive gear 74. As a result, the loading drive gear is rotated counterclockwise and then permits the loading mechanism 54 to carry out its loading operation.

When the reverse rotation of the control motor 55 rotates and returns the loading gear 71 through the changeover gear 69 and so on from its position located when it has been rotated clockwise and hence the relief groove portion 71b$_2$ of the guide groove 71b corresponds to the other engagement pin 72b of the rotation lever 68, the rotation lever 68 becomes rotatable. The rotation of the interlocking gear 67 moves changeover gear 69 toward the switch gear 70 and engages it with the switch gear 70. Then, the one engagement pin 72a of the rotation lever 68 is moved from the relief groove portion 70b$_2$ of the guide groove 70b of the switch gear 70 to face the circular groove portion 70b$_1$ thereof, and the other engagement pin 72b thereof is inserted and engaged with the relief groove portion 71b$_2$ of the guide groove 71b of the loading gear 71 and hence the switch gear 70 is brought into its rotatable state. Then, the loading gear 71 is kept in its rotation stop state.

The returning rotation of the loading gear 71 (the rotation thereof in the counterclockwise direction in FIG. 6) rotates the loading drive gear 74 in the clockwise direction for the loading mechanism 54 to carry out its unloading operation.

As shown in FIG. 8, the rotary switch RS interlined with the rotary switch gear 46 can detect an angle. A microcomputer (not shown) reads a signal indicative of each of detected angles, and under the control of the microcomputer, the control motor 55 is rotated in the forward or reverse direction and turned on and off, thereby respective positions of the gear, i.e., respective positions in an eject/stop (EJECT/STOP), a fast forward/a reverse rewind (F-FF/R-REW), a forward rewind/a reverse fast forward (F-REW/R-FF), a reverse constant-speed tape travel (R-PLAY), and a forward constant-speed tape travel (F-PLAY).

It is an object of the present invention that, in the tape cassette player thus arranged, it is possible to detect stop of a takeup reel turntable upon both of a forward tape travel and a reverse tape travel.

Specifically, in an embodiment of the present invention, as shown in FIGS. 3 and 4, a reflection plate 81 serving as a rotation detecting means is provided on the first relay gear 33 and a photo sensor 82 is disposed so as to be opposed to the reflection plate 81.

More specifically, as shown in FIG. 3, the reflection plate 81 having a reflection surface 81a, whose area is equally divided into plural pieces, e.g., thirty-two pieces in the peripheral direction is fixed on the lower surface of the first relay gear 33. One light reflection type photo interrupter which is the photo sensor 82 is disposed at and connected to a printed wiring board 83 of a circuit for controlling the reel turntables 6, 7 so as to be opposed to the reflection plate 81. When the reflection plate 81 formed integrally with the first relay gear 33 is rotated, the photo interrupter which is the photosensor 82 emits light and detects reflected light thereof, thereby change of a pulse obtained from the detected reflected light being recognized as a tape travel state. When the rotation of the first relay gear 33 is stopped, the pulse obtained from the reflected light from the reflection plate 81 is not changed, thereby a tape position being recognized as a tape end. Then, the tape is reversely travelled or reversely fast forwarded.

Subsequently, operations of the tape cassette player arranged as described above will be described.

The operations of the tape cassette player according to this embodiment are carried out in an order of eject (EJECT) of a tape cassette→stop (STOP)→fast forward upon forward tape travel (F-FF)/rewind upon reverse tape travel (R-REW) →rewind upon forward tape travel (F-REW)/fast forward upon reverse tape travel (R-FF)→reverse constant-speed tape travel (R-PLAY)→forward constant-speed tape travel (F-PLAY). Operations reverse to the above operations are carried out in an order reverse to the above order, i.e., an order of (F-PLAY)→(R-PLAY)→(F-REW).(R-FF)→(F-FF).(R-REW)→(STOP)→(EJECT).

FIG. 2 is a diagram showing an eject and stop mode state (EJECT/STOP). In this state, the mode lever 42 is located at a first position (start point) 42$_1$, and the magnetic head 1 and the pinch rollers 4, 5 are located away from a travel position of the cassette tape T, i.e., since the operation pin 47 projectingly provided at the rear side portion 9g of the head base 9 is engaged with and held by a front step portion 43a of the head base operation cam aperture 43 formed through the mode lever 42, the magnetic head 1 is located at a position displaced in the forward direction (the direction shown by the arrow a) and located away from the travel position of the tape T in the forward direction.

The pinch rollers 4, 5 are brought in their state that forward movement of the head base 9 rotates the pinch roller levers 4a, 5a through the free end side stoppers 4b, 5b in the forward direction (in the direction shown by the arrow a), and located away from the travel position of the cassette tape T in the forward direction.

On the other hand, the operation pin 48 projectingly provided at the first change lever 38 for pivotally supporting the first relay gear 33 through the shaft 36 and the operation pin 49 projectingly provided at the second change lever 40 for pivotally supporting the second relay gear 34 through the shaft 37 are engaged with and held by rear step portions 44a, 45a of first and second change lever operation cam apertures 44, 45 formed through the mode lever 42, respectively. In this state, as shown in FIG. 3, the first relay gear 33 is engaged with the gear 17 fitted through a slip mechanism to the flywheel 13 of the R side capstan 3, and the second relay gear 34 is engaged with the gear 6b of the F-side reel turntable.

In this state, the tape cassette is loaded or ejected. When the tape cassette is loaded, if the tape cassette Tc is inserted into the cassette housing 51 shown in FIG. 1, then the control motor 55 is rotated and rotates the loading gear 71 of the drive mechanism 61 shown in FIG. 6, thereby the loading drive gear 74 being rotated. When the loading drive gear 74 is rotated, the loading mechanism 54 is operated to lower the housing hanger 52 and the lead-in lever mechanism 53 is operated to lowering the cassette housing 51 while drawing the tape cassette Tc into the cassette housing 51. Then the tape cassette Tc is mounted on the mechanical chassis 8, and reel hubs of the tape cassette are engaged with the drive shafts 6a, 7a.

Figure 9:
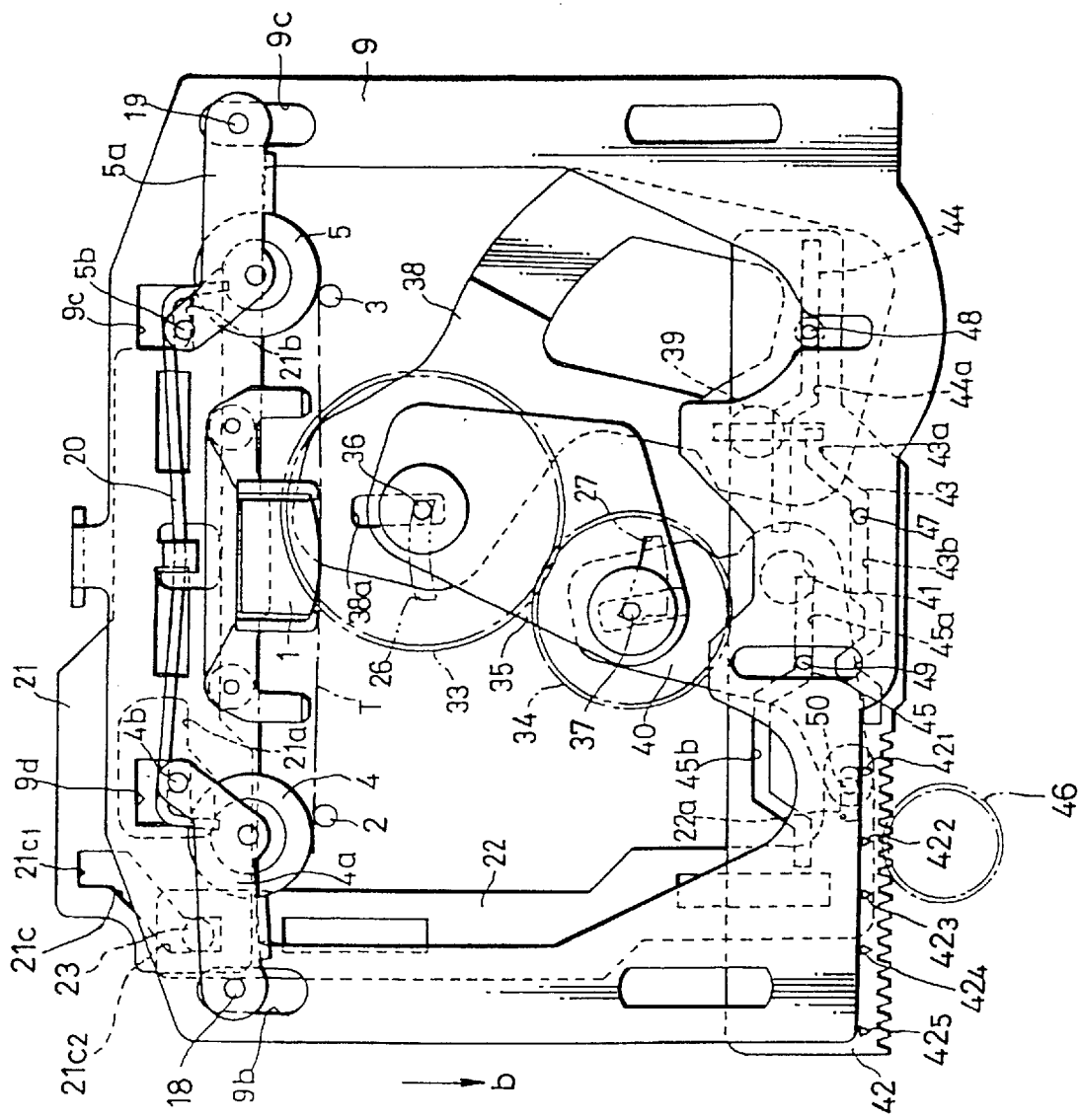
FIG. 9 is a plan view showing a fast forward/reverse rewind state of the changeover mechanism unit.
Figure 10:
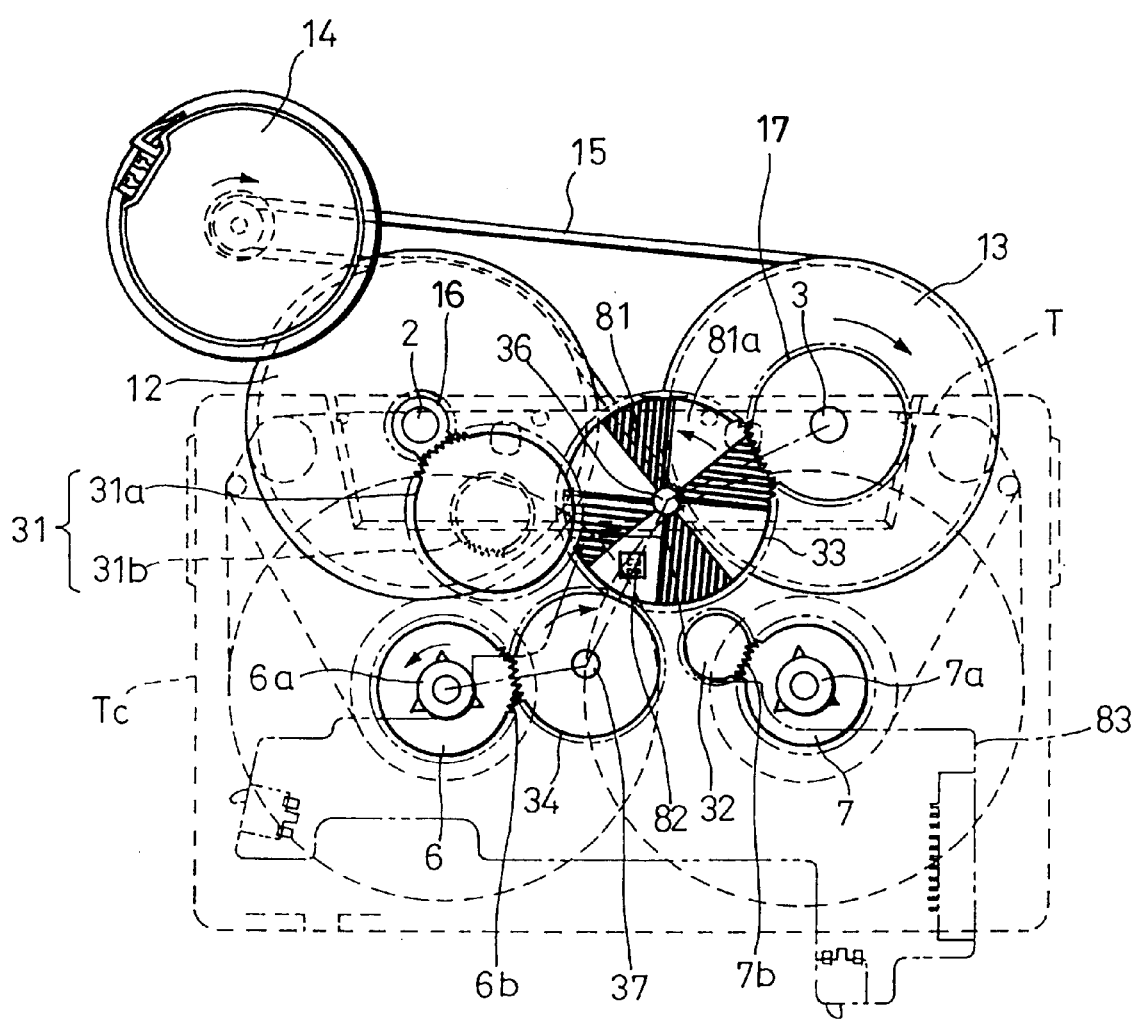
FIG. 10 is a plan view showing a fast forward/reverse rewind state of the tape travel mechanism unit.

FIGS. 9 and 10 are diagrams showing a state of the fast forward upon the forward tape travel (F-FF)/the rewind upon the reverse tape travel (R-REW). In this state, as shown in FIG. 9, as described above, the rotation of the rotary switch gear 46 based on a predetermined rotation of the control motor 55 set by the rotary switch RS moves the mode lever 42 to a second position $42_2$, and then a middle step portion 43b of the head base operation cam aperture 43 is slidably in contact with the operation pin 47 of the head base 9. Therefore, the had base 9 is moved halfway backward (in the direction shown by the arrow b) such that the magnetic head becomes close to the travel position of the tape T. In accordance with this movement of the head base 9, the pinch roller levers 4a, 5a are pressed by the spring member 20 through the stoppers 4b, 5b and then the pinch rollers 4, 5 are rotated backward (in the direction shown by the arrow b) and positioned at the travel position of the tape T, i.e., at the position where they are close to the capstans 2, 3.

In this state, even if the mode lever 42 is moved to the position $42_2$, the operation pins 48, 49 of the first and second change levers 38, 40 engaged with the first and second relay gears 33, 34 are still slidably in contact with the rear step positions 44a, 45a of the change lever operation cam apertures 44, 45, respectively and hence the change levers 38, 40 are both prevented from being rotated. Therefore, as shown in FIG. 10, the first relay gear 33 is engaged with the gear 17 of the flywheel 13 of the R-side capstan 3. On the other hand, the second relay gear 34 is engaged with the gear 6b of the F-side reel turntable 6 and held in a state similar to the state shown in FIG. 3. As a result, the rotation of the R-side capstan 3 is transmitted from the gear 17 through the first relay gear 33 and the second relay gear 34 to the F-side reel turntable 6, thereby the F-side reel turntable 6 being rotated at a high speed.

Since the F-side reel turntable 6 is rotated as described above, the tape T is fast-forwarded upon the forward tape travel and rewound upon the reverse tape travel.

Figure 11:
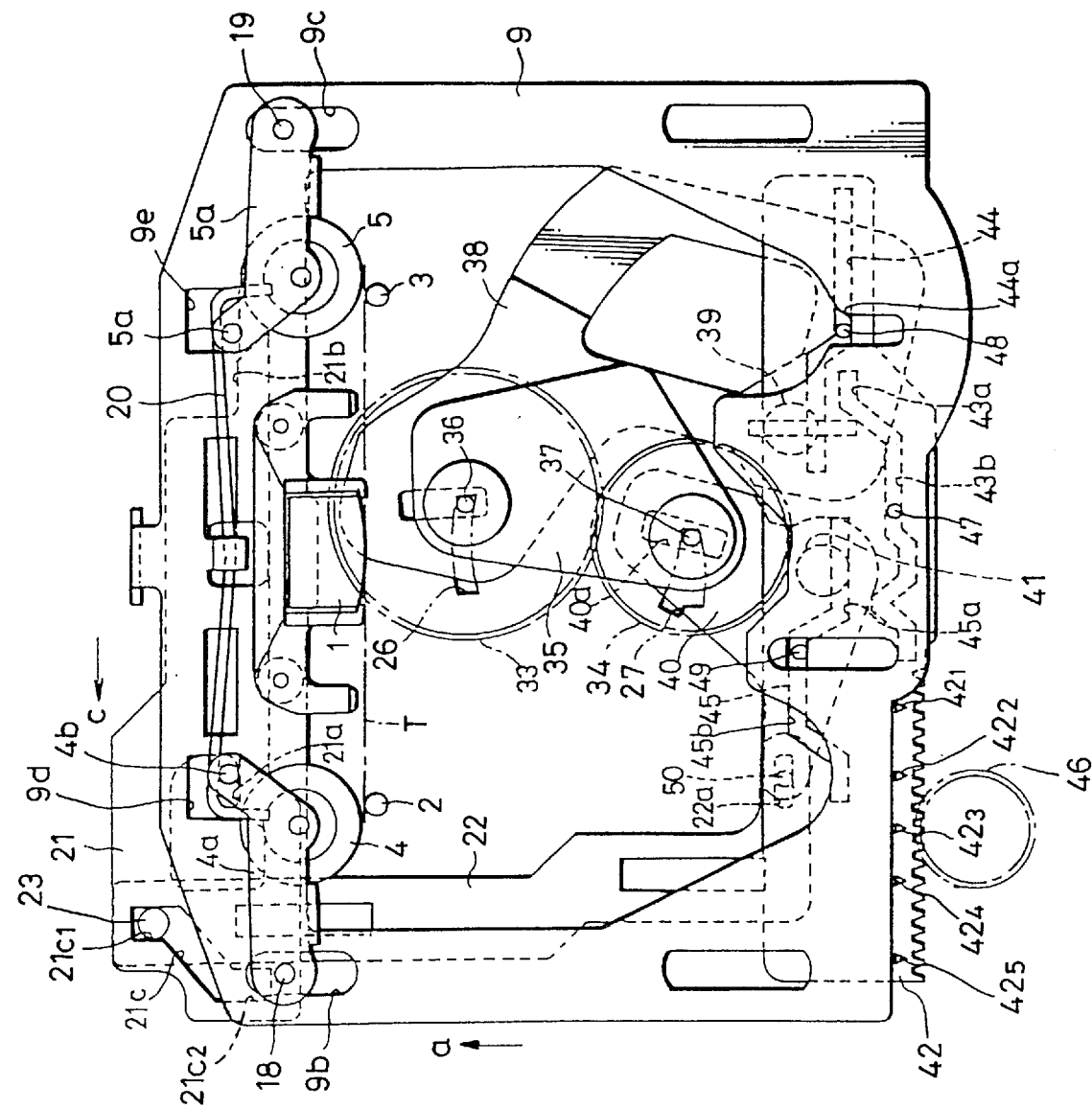
FIG. 11 is a plan view showing a forward rewind/reverse fast forward state of the changeover mechanism unit.
Figure 12:
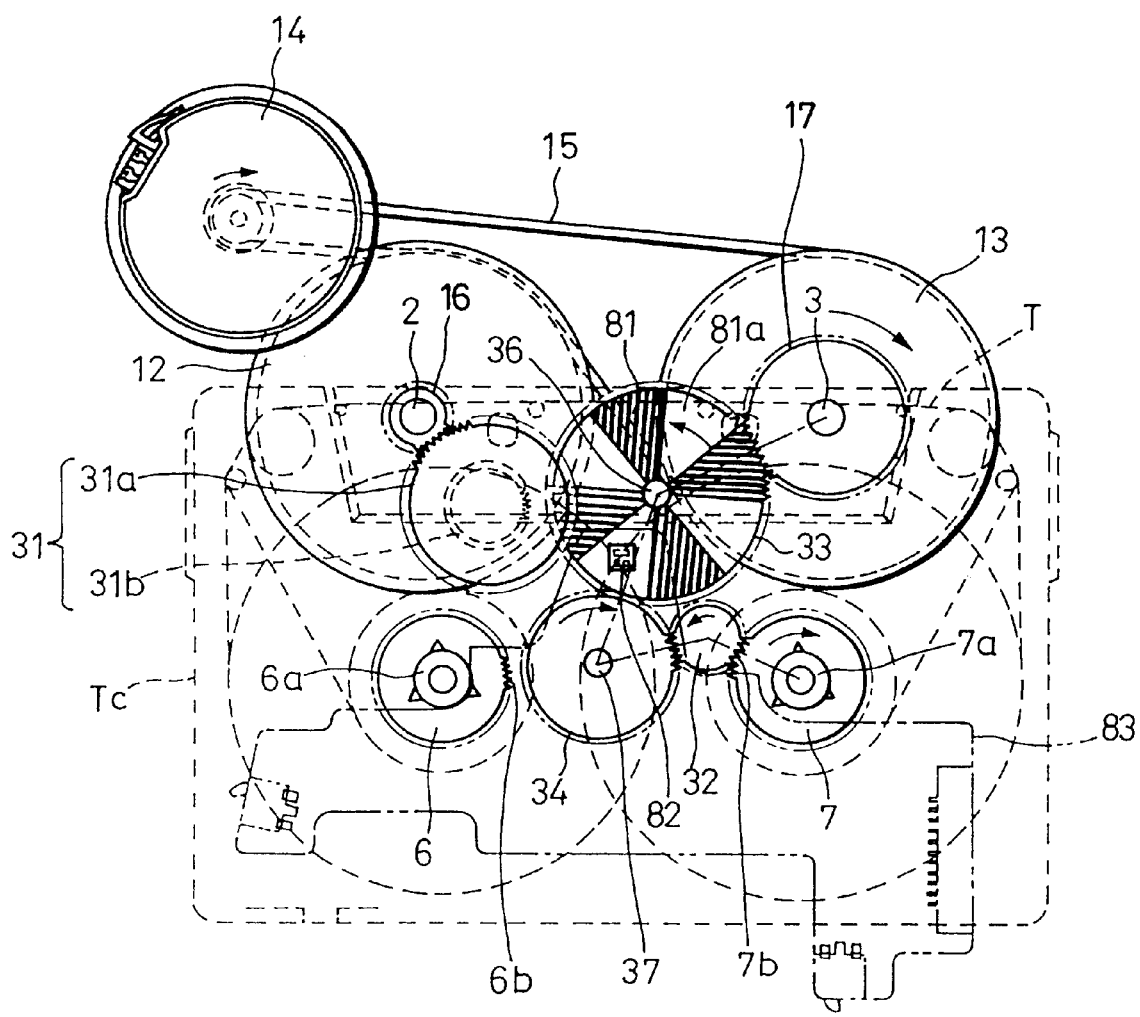
FIG. 12 is a plan view showing a forward rewind/reverse fast forward state of the tape travel mechanism unit.

FIGS. 11 and 12 are diagrams showing a state of a rewind upon the forward tape travel (F-REW)/a fast forward upon a reverse tape travel (R-FF). In this state, as shown in FIG. 11, the mode lever 42 is further moved by the rotary switch gear 46 to a third position $42_3$. When the mode lever 42 is moved to the third position $42_3$, the head base 9 is not allowed to be moved because the operation pin 47 thereof is still kept in slidable contact with the middle step portion 43b of the head base operation cam aperture 43, and the magnetic heads 1 and the pinch rollers 4, 5 are kept at the same positions as the above positions (shown in FIG. 9).

The first change lever 38 engaged with the first relay gear 33 is not rotated because the operation pin 48 thereof is kept in slidable contact with the rear step portion 44a of the first change lever operation cam aperture 44 of the mode lever 42, and, as shown in FIG. 12, the first relay gear 33 is still kept in a state in which it is engaged with the gear 17 on the side of the R-side capstan 3.

On the other hand, since the operation pin 49 of the second change lever 40 engaged with the second relay gear 34 is in slidable contact with the front step portion 45b of the second change lever operation cam aperture 45 of the mode lever 42, a forward pressing force is applied to the operation pin 49. As a result, the second change lever is rotated around a fulcrum shaft 41 provided at its middle portion (in the clockwise direction in FIG. 11).

The rotation of the second change lever 40 presses the shaft 37 of the second relay gear 34 through a long aperture 40a of the former. Therefore, the gear lever 35 is rotated around the shaft 36 of the first relay gear 33, more specifically around the shaft 36 kept in a state in which it is engaged with an R-side capstan 3 side end portion of the first guide aperture 26, and the shaft 37 of the second relay gear 34 is engaged with an R-side capstan 3 side end portion of the second guide aperture 27.

As a result of this operation, as shown in FIG. 12, the second relay gear 34 is engaged with the R-side reverse-rotation gear 32 engaged with the gear 7b of the R-side reel turntable 7, thereby the rotation of the gear 17 being transmitted to the R-side reel turntable 7 through the first and second relay gears 33, 34 and the R-side reverse-rotation gear 32. Therefore, the R-side reel turntable 7 is rotated at a high speed, and the tape is rewound upon the normal tape travel and fast forwarded upon the reverse tape travel. The rotation speed of the R-side reel turntable 7 in this state becomes the same as the rotation speed of the F-side reel turntable 6 in the above operation.

In this state, i.e., in a state in which the second change lever 40 is rotated around the fulcrum shaft 41 (in the clockwise direction in FIG. 11), the interlocking lever 22 is pressed forward (in the direction shown by the arrow a) through an interlocking pin 50 engaged with the engagement aperture 22a thereof and slidably moved. Then, the engagement piece 23 projectingly provided at the front end thereof is slidably moved forward in the cam aperture 21c of the pinch roller changeover lever 21 and engaged with the front end portion $21c_1$ located on the inner side thereof. As a result, the pinch roller changeover lever 21 is slidably moved outward (in the direction shown by the arrow c) and thereby the F-side engagement stopper portion 21a corresponds to the stopper 4b of the F-side pinch roller lever 4a.

Figure 13:
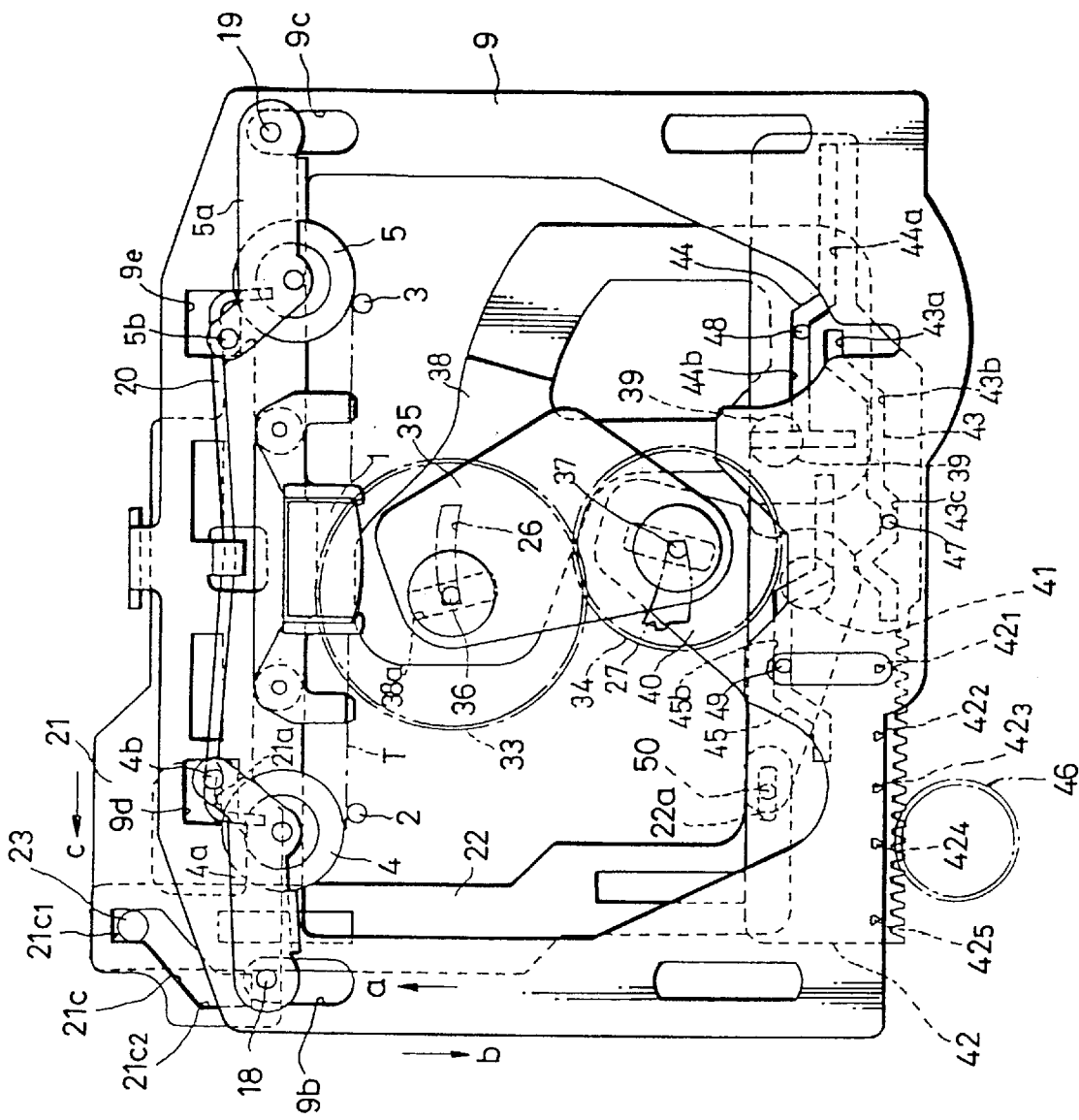
FIG. 13 is a plan view showing a reverse constant-speed tape travel state of the changeover mechanism unit.
Figure 14:
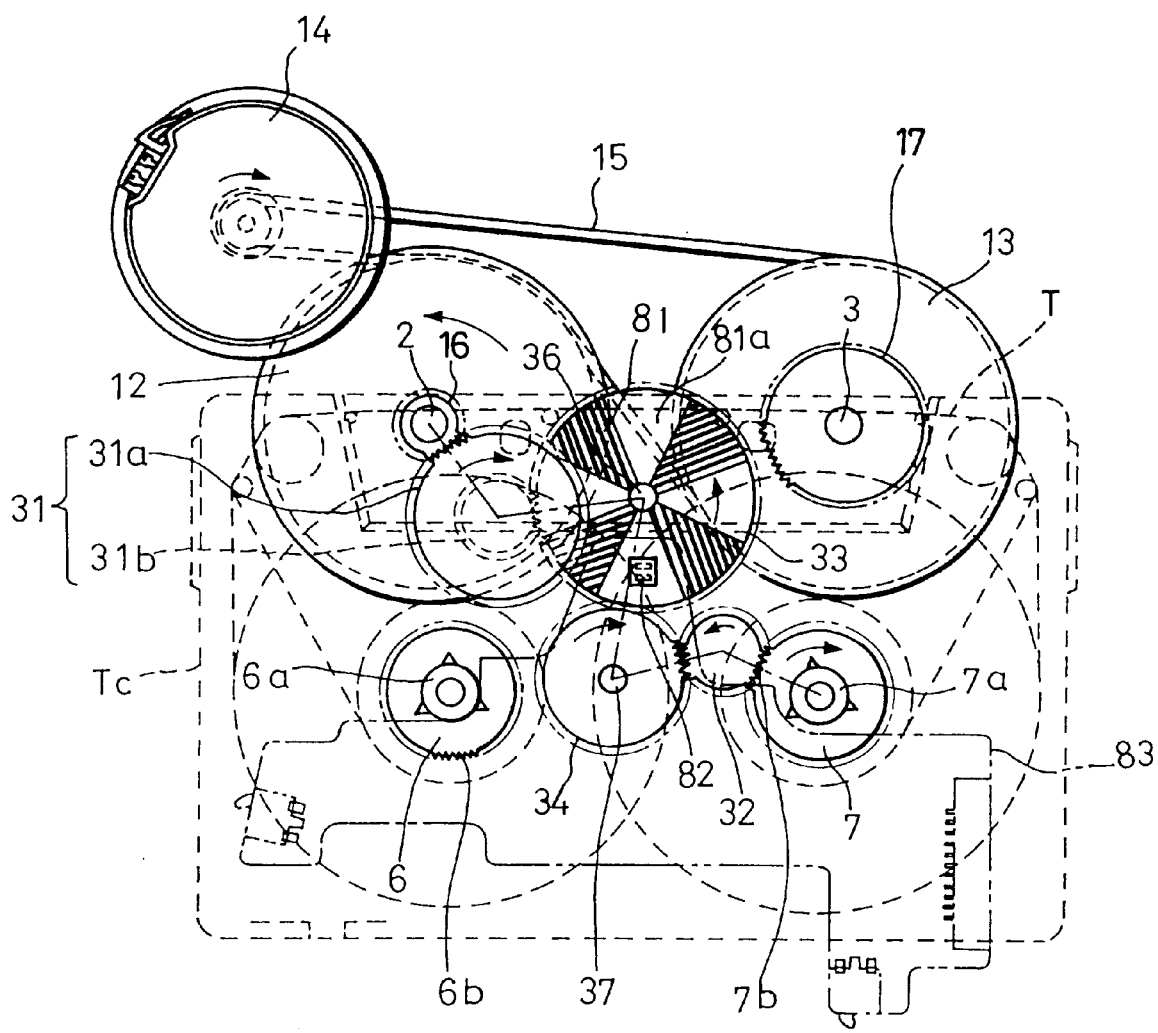
FIG. 14 is a plan view showing a reverse constant-speed tape travel state of the tape travel mechanism unit.

FIGS. 13, 14 are diagrams showing a state of the reverse constant-speed tape travel (R-PLAY). In this state, as shown in FIG. 13, the mode lever 42 is moved by the rotary switch gear 46 to a fourth position $42_4$. When the mode lever 42 is moved to the fourth position $42_4$, the operation pin 47 of the head base 9 is slidably in contact with the rear step portion 43c of the head base operation cam aperture 43. As a result, since the operation pin 47 is presses backward, the head base 9 is moved backward (in the direction shown by the arrow b), and consequently the magnetic head 1 is brought to face the tape travel position and brought in contact with the tape T. When the head base 9 is moved backward, the pinch roller levers 4a, 5a are pressed by the spring member 20 and hence the pinch rollers 4, 5 are also moved backward (in the direction shown by the arrow b). In this state, since the slidable movement of the above pinch roller changeover lever 21 in the outward direction (in the direction shown by the arrow c) brings the stopper 4b of the pinch roller lever 4a in contact with an F-side engagement edge portion 21a of the pinch roller changeover lever and hence the pinch roller lever 4a is prevented from being rotated, the F-side pinch roller 4 is prevented from being moved backward (in the direction shown by the arrow b), and hence only the R-side pinch roller 5 is moved backward (in the direction shown by the arrow b) and pressed to the R-side capstan 3 by the rotation of the pinch roller lever 5a. Specifically, the tape T is pressed and sandwiched by the R-side pinch roller and the R-side capstan 3.

Simultaneously with this operation, the operation pin 48 of the first change lever 38 engaged with the first relay gear 33 is slidably in contact with the front step portion 44b of the first change lever operation cam aperture 44 of the mode lever 42 and the operation pin 48 is applied with a forward pressing force (the direction shown by the arrow a), so that the first change lever is rotated around the fulcrum shaft 39 (in the counterclockwise direction in FIG. 13).

In this state, since the operation pin 49 of the second change lever 40 engaged with the second relay gear 34 is still slidably kept in contact with the front step portion 45b of the second change lever operation cam aperture 45 of the mode lever 42, the second change lever is prevented from being rotated. Consequently, the second relay gear 34 is still kept in a state in which it is engaged with the R-side reverse-rotation gear 32 as shown in FIG. 14.

As described above, since only the first change lever 38 is rotated, the shaft 36 of the first relay gear 33 is pressed through the long aperture 38a of the first change lever. In accordance with this operation, the gear lever 35 is rotated around the shaft 37 of the second relay gear 34, i.e., around the shaft 37 set in a state in which it is engaged with the R-side capstan 3 side end portion of the second guide aperture 27, and the shaft 36 of the first relay gear 33 is engaged with the F-side capstan 2 side end portion of the first guide aperture 26.

As a result, as shown in FIG. 14, the first relay gear 33 is engaged with the small gear 31b of the play gear 31 whose large gear 31a meshing with the gear 16 of the F-side capstan 2. This operation permits the rotation of the F-side capstan 2 to be transmitted from the gear 16 rotated integrally with the flywheel 12 through the play gear 31, the first relay gear 33, the second relay gear 34 and the R-side reverse-rotation gear 32 to the R-side reel turntable 7, thereby the R-side reel turntable 7 being rotated at a constant speed.

Thus, since the R-side reel turntable 7 is rotated, the tape T is travelled from the F-side reel turntable 6 side to the R-side reel turntable 7 side at a constant speed by the R-side capstan 3 and the pinch roller 5, and the reverse-direction recording and reproduction are carried out through the magnetic head 1.

Figure 15:
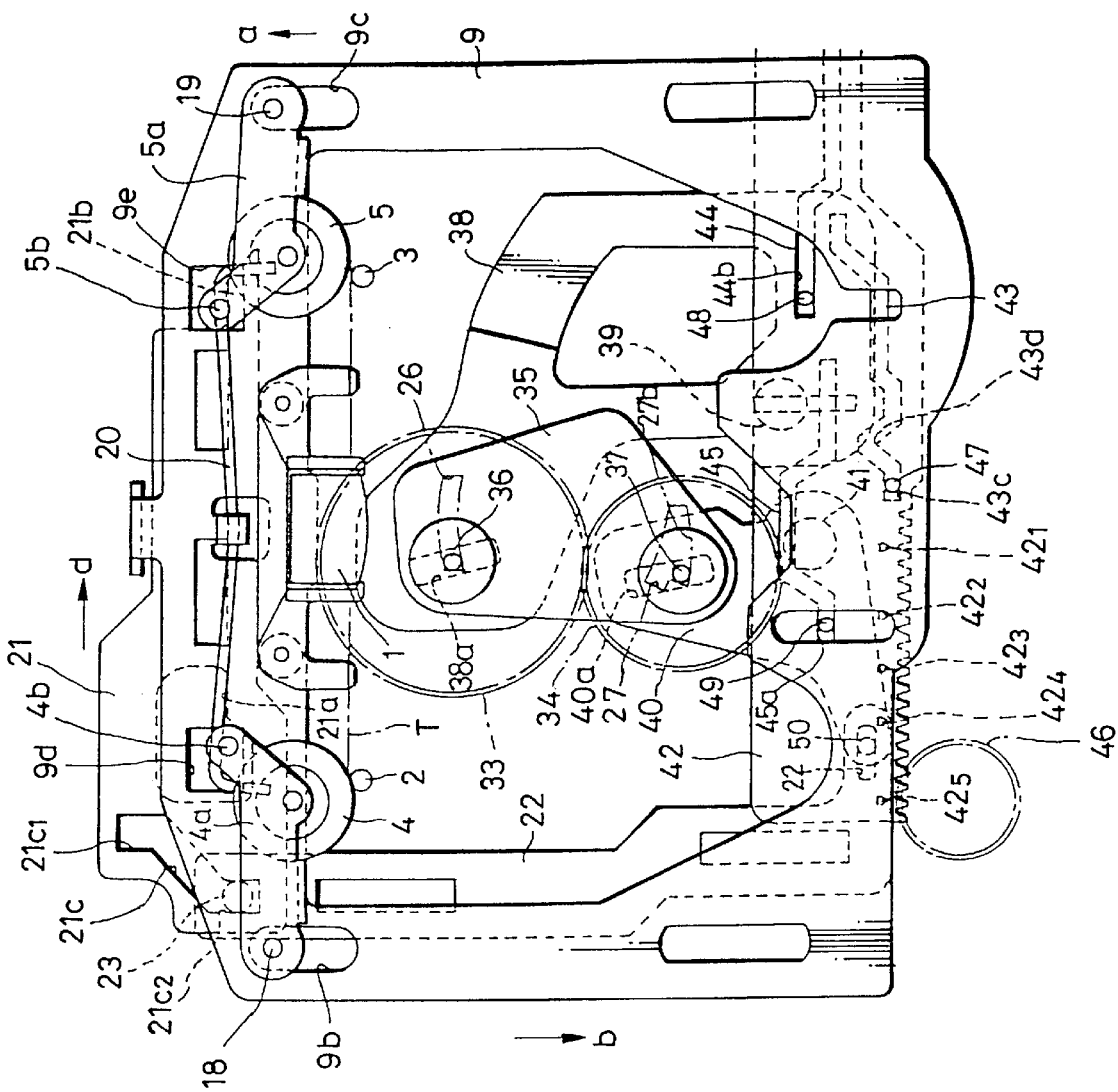
FIG. 15 is a plan view showing a forward constant-speed tape travel state of the changeover mechanism unit.
Figure 16:
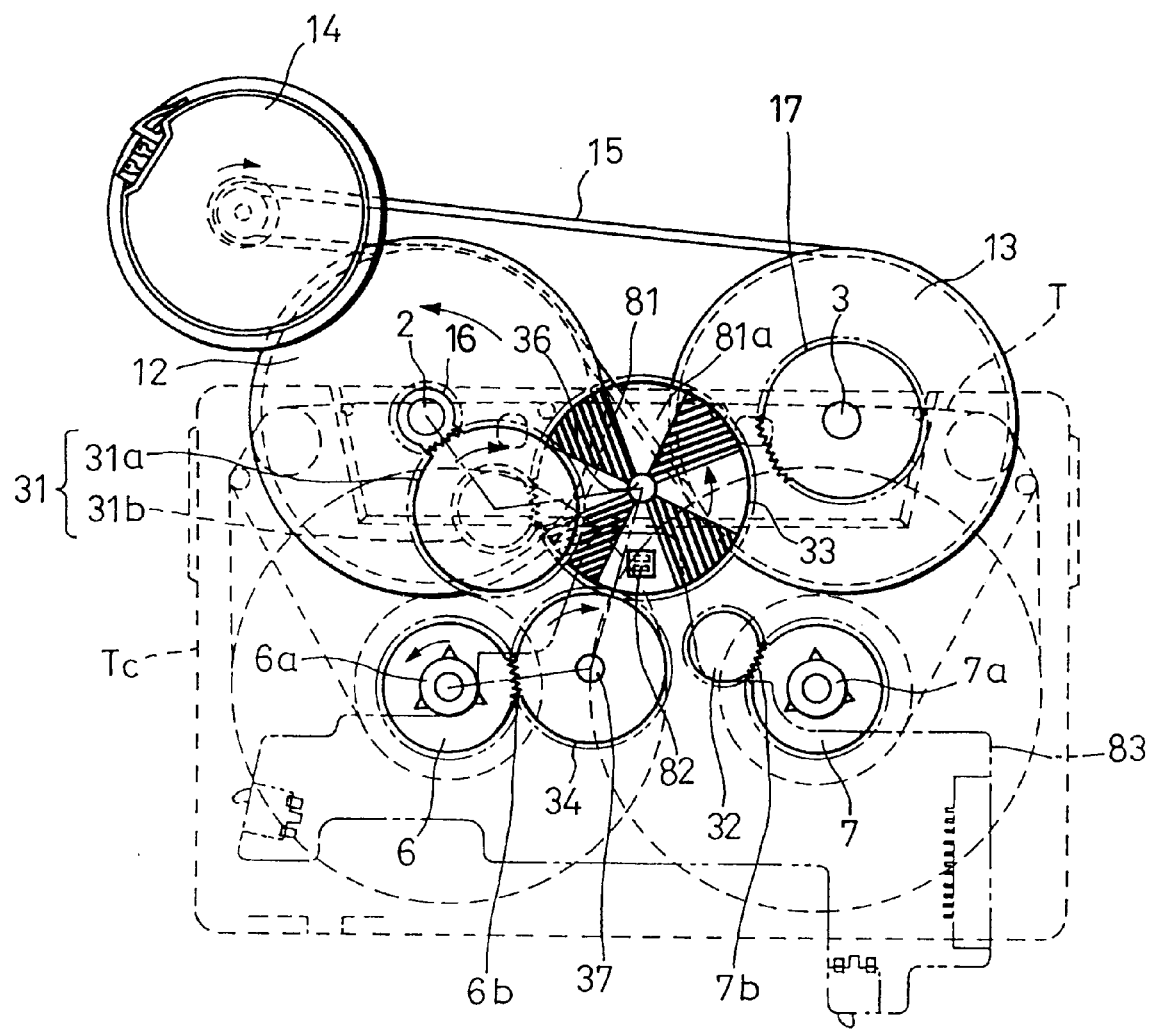
FIG. 16 is a plan view showing a forward constant-speed tape travel state of the tape travel mechanism unit.

FIGS. 15 and 16 are diagrams showing a state of a forward constant-speed tape travel (F-PLAY). In this state, as shown in FIG. 15, the mode lever 42 is moved by the rotary switch gear 46 from the above fourth position $42_4$ to a fifth position $42_5$. When the mode lever 42 is moved to the fifth position $42_5$, the operation pin 47 of the head base 9 is slidably in contact with an end portion of the rear step portion 43c of the head base operation cam aperture 43. However, since a reverse V-shaped projectingly bent portion 43d which is bent forward is formed at the middle portion of the rear step portion 43c, this projectingly bent porion 43d presses the operation pin 47 with being in slidable contact with the operation pin. As a result of this operation, the head base 9 is temporarily moved forward (in the direction shown by the arrow a) and hence the magnetic head 1 is brought away from the tape travel position. On the other hand, since the pinch roller lever 5a is pressed by the head base 9 through the stopper 5b and rotated forward (in the direction shown by the arrow a), the R-side pinch roller 5 is also brought away from the R-side capstan 3.

In this state, since the operation pin 48 is still kept in slidable contact with the front step portion 44b of the first change lever operation cam aperture 44, the first change lever 38 is prevented from being rotated. On the other hand, since the operation pin 49 is brought in slidable contact with the end portion of the rear step portion 45a of the second change lever operation cam aperture 45, the second change lever 40 is rotated around the fulcrum shaft 41 (in the counterclockwise direction in FIG. 15).

When the second change lever 40 is rotated, the shaft 37 of the second relay gear 34 is pressed through the long aperture 40a. As a result, the gear lever 35 is rotated around the shaft 36, of the first relay gear 33, set in a state in which it is engaged with the F-side capstan 2 side end portion of the first guide aperture 26, and the shaft 37 of the second relay gear 34 is engaged with the F-side capstan 2 side end portion of the second step aperture portion 27b of the second guide aperture 27.

Thus, as shown in FIG. 16, the second relay gear 34 is engaged with the gear 6b of the F-side reel turntable 6. This operation permits the rotation of the F-side capstan 2 to be transmitted to the F-side reel turntable 6 from the gear 16 through the play gear 31, the first relay gear 33, and the second relay gear 34, thereby the F-side reel turntable 6 being rotated at a constant speed.

In this state, i.e., in a state, the second change lever 40 is rotated counterclockwise as shown in FIG. 15, the interlocking lever 22 is slidably moved backward (in the direction shown by the arrow b). The slidable movement of the interlocking lever 22 permits the engagement piece 23 provided at its front end to be moved backward (in the direction shown by the arrow b) in the cam aperture 21c of the pinch roller changeover lever 21 to thereby be engaged with the rear end portion $21c_2$ located on the outer side. Thus, the pinch roller changeover lever 21 is slidably moved inward (in the direction shown by an arrow d) and then held.

When the pinch roller changeover lever 21 is slidable moved in the inward direction (direction shown by the arrow d) and then positioned, the R-side engagement edge portion 21b thereof is engaged with the stopper 5b of the pinch roller lever 5a of the R-side pinch roller 5. As a result, the pinch roller lever 5a is prevented from being rotated, thereby the pinch roller 5 being held in a state in which it is kept away from the R-side capstan 3.

On the other hand, the F-side engagement edge portion 21a of the pinch roller changeover lever 21 is brought away from a position where it is opposed to the stopper 4b of the F-side pinch roller lever 4a. As a result, the pinch roller lever 4a becomes rotatable. Therefore, the F-side pinch roller 4 is pressed to the F-side capstan 2, i.e., the tape T is pressed and sandwiched by the F-side pinch roller and the F-side capstan 2.

Thus, the mode is changed from the reverse play mode to the forward play mode, and the tape T is travelled at a constant speed by the F-side capstan 2 and the F-side pinch roller 4 from the R-side reel turntable 7 side to the F-side reel turntable 67 side. Then the forward recording and reproduction are carried out through the magnetic head 1.

Figure 17:
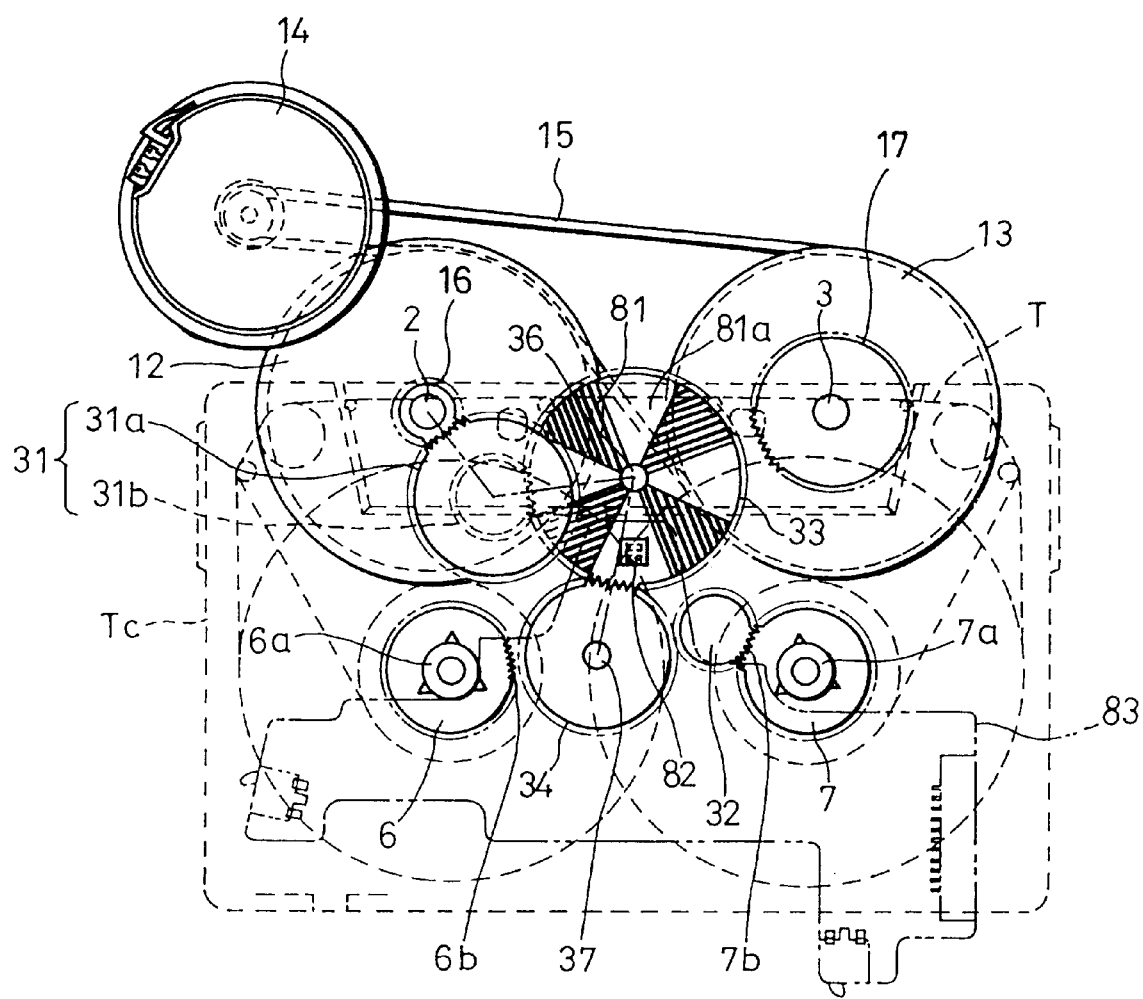
FIG. 17 is a plan view showing a changeover middle state of the tape travel mechanism unit.

As described above, while the mode is changed from the reverse play mode to the forward play mode, the operation pin 49 is slidably moved in an inclined portion between the front step portion 45b and the rear step portion 45a of the second change lever operation cam aperture 45 and hence the second change lever 40 is prevented from being rotated quickly. Therefore, as shown in FIG. 17, the second relay gear 34 is brought away from the R-side reverse-rotation gear 32 and brought in a state in which it is not engaged with the gear 6b of the F-side reel turntable 6.

This operation brings both of the reel turntables 6, 7 in their free states once. As shown in FIG. 16, in the above states, the rotation of the F-side capstan 2 is transmitted to the F-side reel turntable 6, and then both of the reel turntables are brought into their forward play states. Therefore, the tape T is prevented from being applied with unnecessary tension.

As described above, since the control motor 55 is driven to rotate the rotary switch gear 46, the mode is successively changed from the stop (STOP) mode to the forward constant-speed tape travel (F-PLAY) mode. If the control motor 55 is reversely rotated from the state of the forward constant-speed tape travel (F-PLAY) mode to thereby rotate the rotary switch gear 46 reversely, the mode proceeds from the forward constant-speed tape travel (F-PLAY) mode to the stop (STOP) mode.

It is possible to return the mode to the stop (STOP) mode at the middle of the above operation.

The tape cassette player according to this embodiment can recognize the tape travel states of the fast forward upon the forward tape travel (F-FF)/the rewind upon the reverse tape travel (R-REW), the rewind upon the forward tape travel (F-REW)/the fast forward upon the reverse tape travel (R-FF), the reverse constant-speed tape travel (R-PLAY), and the forward constant-speed tape travel (F-PLAY).

Specifically, as shown in FIGS. 3, 4, the reflection plate 81 having the reflection surface 81a obtained by equally dividing a surface of the reflection plate into plural pieces, e.g., thirty-two pieces in the peripheral direction is fixed on the first relay gear 33 of the relay gears commonly engaged with the gear 6b of the F-side reel turntable 6 and the gear 7b of the R-side reel turntable 7. Since the reflection plate is rotated together with the first gear 33, if the photo sensor (photo interrupter) 82 emits light to the reflection plate 81 and receives reflected light therefrom, then the change of the pulses obtained from the received reflected light is recognized as the tape travel state.

When the tape is traveled up to its tape end in each of the tape travel states, the rotation of the first relay gear 33 is stopped. As a result, the pulse obtained from the received reflected light is not changed, and hence it is recognized that a tape position is the tape end. Then, the mode proceeds to the reverse constant-speed tape travel or the reverse fast forward.

As described above, according to this embodiment, since the first relay gear 33 is engaged with the play gear 31 in the modes of the reverse constant-speed tape travel (R-PLAY) and the forward constant-speed tape travel (F-PLAY) and is engaged with the gear 17 of the capstan 3 in the modes of the fast forward (F-FF) and the rewind (R-REW), the above operation is made possible.

The reason for this is that the drive system for the takeup side and the supply side is formed of a drive system employing one play gear 31 which is common to both of them.

As described above, according to this embodiment, since, without the photo interrupter which is the photo sensor 82 of the tape end detecting means on each of the takeup side and the supply side, only one detecting means is employed for both of the takeup side and the supply side upon the forward tape travel and the reverse tape travel, it is considerably advantageous in reliability.

The tape player arranged as described above has a detection controlling mechanism which can detect a no-signal portion between signal recorded portions recorded on the tape T and can detect a portion between musics recorded on the tape T on which a plurality of musics are recorded, i.e., detect a no-music portion to thereby detect a start portion of the next music at the succeeding state (search for a head of a music).

Figure 18:
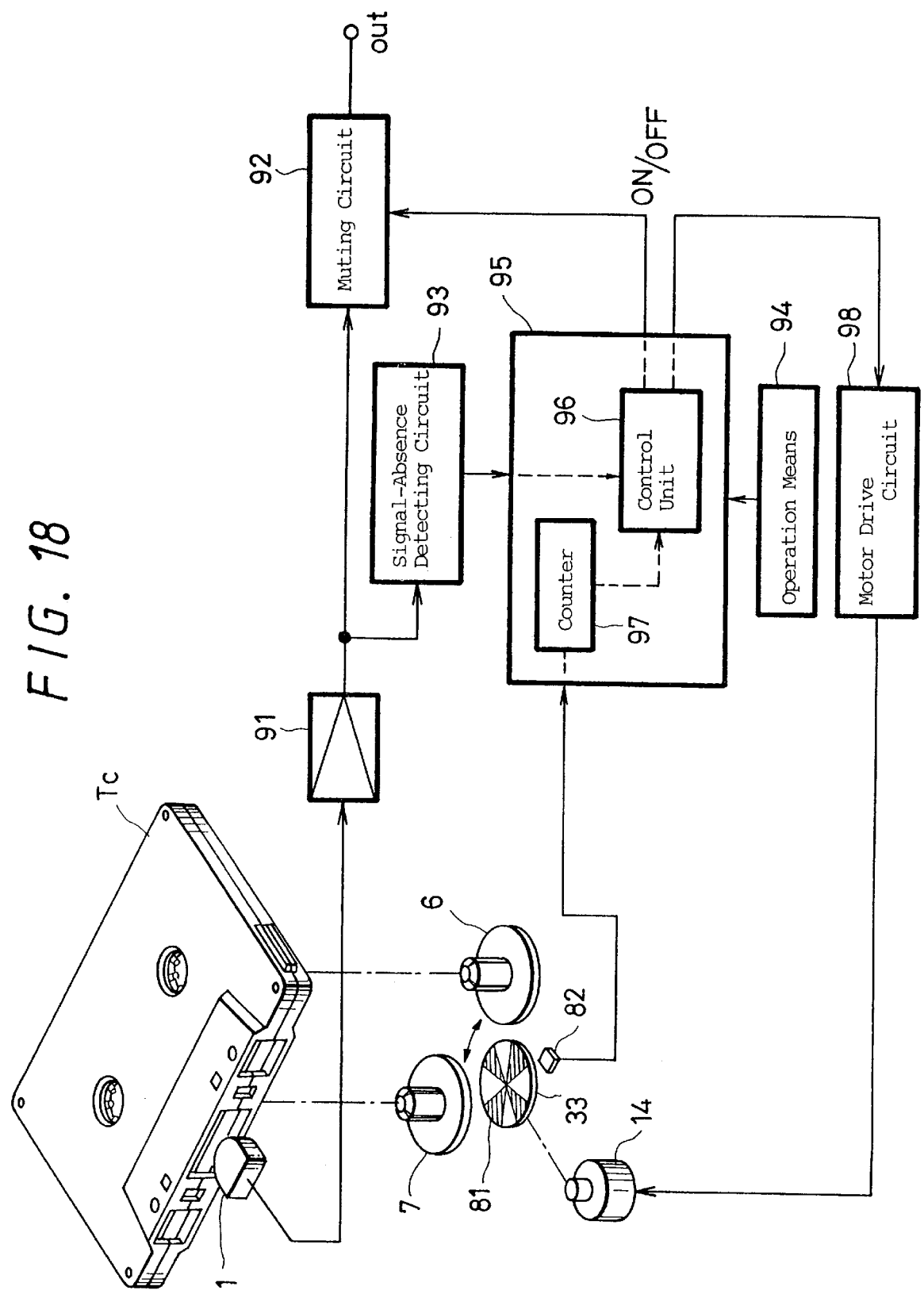
FIG. 18 is a systematic diagram of a rotation detecting and controlling mechanism.

The detection controlling mechanism is arranged as shown in FIG. 18, for example. A signal output from the magnetic head 1 is amplified by an amplifier 91, and then an amplified signal is output through a muting circuit 92. A signal-absence detecting circuit 93 is connected to an output side of the amplifier 91. A detection signal therefrom is supplied to a control unit 96 of a controller 95 operated by an operating means 94.

The controller 95 has a counter 97 which is supplied with an output from a rotation detecting mechanism formed of the reflection plate 81 fitted to the above first relay gear 33 and the photo sensor 82. An output from the counter 97 is supplied to the control unit 96. The control unit 96 outputs a signal used to set the muting circuit 92 in its on-state and off-state. The control unit 96 outputs a control signal used to control a motor drive circuit 98 for driving the capstan motor 14.

The detection control mechanism has an automatic music sensor (AMS), which is the function for searching for a head of a desired music when a plurality of musics are recorded on the tape T, and hence can search for a head of a music upon the tape fast forward. This operation will hereinafter be described.

The music head searching operation in the fast forward (F-FF) operation shown in FIG. 10 will be described with reference to FIG. 19. It is assumed that a music recorded part on the tape T is depicted by Si and a music-absence part by So, and the movement direction of the magnetic head 1 relative to the tape T is shown by an arrow. The signal-absence detecting circuit 93 detects a state that a magnetic-head position is shifted from the music recorded part Si to the music-absence part So during the fast forward (F-FF) operation. The rotation of the take-up side, i.e., F-side reel turntable 6, i.e., the rotation of the above relay gear 33 is detected by employing the reflection plate 81 and the photo sensor 82 and then counted by the counter 97. If the count value of the counter becomes a predetermined number, e.g., eleven in a continuous no-music state, then the control unit 96 determines that this portion is a music-absence part.

In a state that the magnetic-head position is shifted from the music-absence part So to the music recorded part Si at the next stage, the rotation of the relay gear 33 is detected and counted by the counter 97. In this music detected state, if the count value becomes a predetermined number, e.g., forty counts, then the control unit 96 determines that this part is the music recorded part. Thus, the fast forward (F-FF) operation is carried out, and a head portion of the next music recorded part Si is detected. Then, the motor drive circuit 98 is controlled based on the signal from the control unit 96, then the operation being changed to the forward rewind (F-REW) operation.

In the forward rewind (F-REW) operation, the magnetic-head position is returned from the next music recorded part Si to the music-absence part So. In this state, the rotation of the R-side reel turntable 7, i.e., the rotation of the first relay gear 33 is detected by the reflection plate 81 and the photo sensor 82 and the number of rotation is counted by the counter 97. If the count value thereof becomes a predetermined number, i.e., four counts in a continuous no-music state, then the control unit 96 determined that the magnetic head is located at the music-absence part. Then, the motor drive circuit 98 is controlled to shift the operation to the forward constant-speed tape travel (F-PLAY) operation.

If a music-absence part is continuously detected for a predetermined time, e.g., 500 ms in the forward constant-speed tape travel (F-PLAY) operation or if existence of a music-absence part cannot be determined within five seconds at maximum, then the control unit 96 supplies an muting-off signal to the muting circuit 92 to release a reproduction muting operation. Then, the mode is returned to a normal playback mode, and the music-part Si is reproduced. A release interval of the muting operation carried out when the above music-head searching operation is stopped in the middle thereof since a tape end or the like is detected is set to 300 ms which is a usual value.

A head searching operation in the forward rewind (F-REW) operation shown in FIG. 12 will subsequently be described with reference to FIG. 20. Similarly to the operation shown in FIG. 19, it is assumed that a music recorded part on the tape T is depicted by Si and a music-absence part is depicted by So, and a movement direction of the magnetic head 1 relative to the tape T is shown by an arrow.

In a state that a magnetic-head position is shifted from the music recorded part Si to the music-absence part So during the fast forward (F-FF) operation of the tape T, the rotation of the take-up side, i.e., R-side reel turntable 7, i.e., the rotation of the above relay gear 33 is detected by the reflection plate 81 and the photo sensor 82 and then counted by the counter 97. If the count value of the counter becomes a predetermined number, e.g., eleven in a continuous music detected state, then the control unit 96 determines that this portion is a music recorded part.

In a state that the magnetic-head position is shifted from the music recorded part Si to a music-absence part So, the rotation of the relay gear 33 is detected and the number of the rotation is counted by the counter 97. In this no-music detected state, if the count value becomes a predetermined number, e.g., forty counts, then the control unit 96 determines that this part is the music-absence part. Thus, the forward rewind (F-REW) operation is carried out, and a head portion of the music recorded part Si is detected. Then, the motor drive circuit 98 is controlled based on the signal from the control unit 96, then the operation being changed to the forward constant-speed tape travel (F-PLAY) operation.

Similarly to the head searching operation carried out in the forward rewind (F-FF) operation, if a music-absence part is continuously detected for a predetermined time, e.g., 500 ms in the forward constant-speed tape travel (F-PLAY) operation or if existence of a music-absence part cannot be determined within five seconds at maximum, then the control unit 96 supplies an muting-off signal to the muting circuit 92 to release a reproduction muting operation. Then, the mode is returned to a normal playback mode, and the music-part Si is reproduced. A release interval of the muting operation carried out when the above music-head searching operation is stopped in the middle thereof since a tape end or the like is detected is set to 300 ms which is a usual value.

As described above, it is possible to precisely detect the portion between the musics recorded on the tape T by carrying out the reverse fast-forward operation of the tape T of the forward fast forward (F-FF) operation and the forward rewind (R-REW) operation in the forward constant-speed tape travel (F-PLAY) operation, and hence it is possible to reliably reproduce a desired music from its head.

Figure 19:
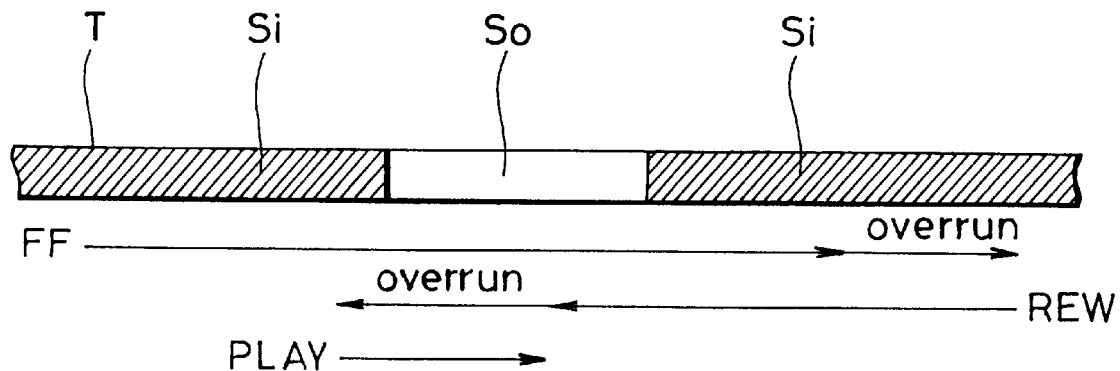
FIG. 19 is a diagram used to explain a music-absence part detection mode in the tape fast forward state.
Figure 20:
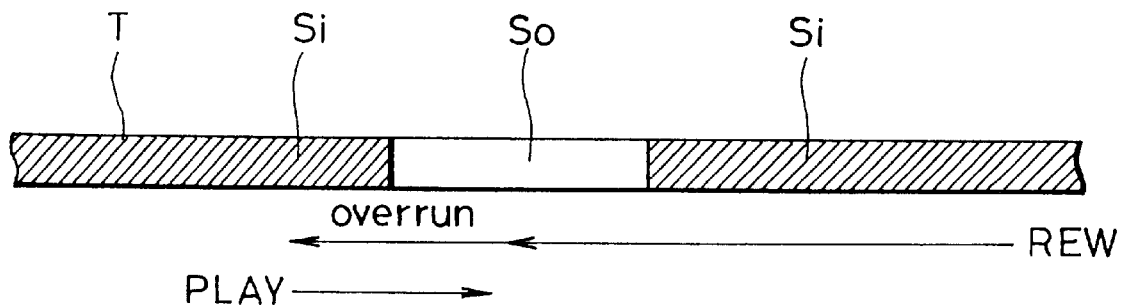
FIG. 20 is a diagram used to explain a music-absence part detection mode in the tape rewind state.

Even in the reverse constant-speed tape travel (R-PLAY) operation, an operation, reverse to the above operation, including the reverse fast forward (R-FF) operation and the reverse rewind (R-REW) operation, i.e., the head searching operation carried out by the reverse fast forward (R-FF) operation is carried out the operation carried out in the direction reverse to that of the head searching operation carried out by the forward fast forward (F-FF) operation shown in FIG. 19. In the head searching operation carried out by the reverse rewind (R-REW) operation, it is possible to precisely detect the portion between the musics recorded on the tape T by carrying out the operation carried out in the direction reverse to that of the head searching operation carried out by the forward rewind (F-REW) shown in FIG. 20, and hence it is possible to precisely reproduce a desired music.

While the operation for automatically selecting the musics recorded on the tape T, i.e., searching for a head of a music has been described, the present invention can be applied to retrieval of a position of other information signal recorded on the tape T.

While the embodiment according to the present invention has been described, the present invention is not limited to the above embodiment. The mechanism for switching the relay gears 33, 34 may be arranged such that the constant-speed tape travel and the fast forward tape travel are switched and the rotational drive force can be commonly transmitted to each of the takeup-reel turntables in the both of the forward tape travel and the reverse tape travel. This switching operation can be carried out by employing a plunger or the like.

The reflection plate 81 may be provided on the second relay gear 34. In this case, the photo interrupter serving as the photo sensor 82 is disposed so as to be opposed to the second relay gear 34. The reflection surfaces 81*a* of the reflection plate 81 may be divided into pieces of an optional number into and then set.

The rotation detecting means is not limited to the reflection plate 81, and may be arranged as that of a light transmission type such that a plurality of light-transmissive slits are radially provided at a constant interval and a light emitter and a photo sensor of the photo interrupter as the photo sensor 82 are disposed in a case so as to be opposed to each other across a space.

The relay gear as a relay rotation member may be attached with a rotating magnet to form a rotation detecting means, a magnetic head, a Hall element and so on being employed as a sensor therefor. The count value by the relay gear 33 used in the automatic music selection operation for the musics recorded on the tape T for determining whether or not a music is recorded can be optionally set.

As described above, according to the tape-like recording medium travelling and driving apparatus of the present invention, since the one rotation detecting mechanism detects the rotations of the first and second reel turntables to detect the travel of the tape-like recording medium and a switching operation of each of the mechanisms is carried out based on the detection signal from the one rotation detecting mechanism, the switching operation of each of the mechanisms is reliably carried out, which remarkably improves the reliability. Since consequently the arrangement of the rotation detecting mechanism is simplified and the circuit for transmitting a signal to the respective mechanisms is also simplified, it becomes possible to reduce the number of parts, of assembly processes and so on, which brings effects such as the advantage in manufacturing costs.

INDUSTRIAL APPLICABILITY

The present invention is not limited to the tape travelling and driving apparatus of the tape player employing the compact tape cassette and can be applied to recording and/or reproducing apparatus employing various tape-like recording media such as a video tape recorder, a data tape recorder or the like. In this case, dimensions, shapes, positional relationships and so on of the respective members and parts will be changed depending upon each of the apparatus.

What is claimed is:

1. A tape-like recording medium travelling and driving apparatus, comprising:

a pair of flywheels respectively rotated, and a first reel turntable and a second reel turntable, wherein a common belt wound around said pair of flywheels is attached to a capstan motor which rotates in one direction such that each flywheel of said pair of flywheels respectively rotates in one direction;

a first reel gear unit provided on said first reel turntable and rotated together with said first reel turntable;

a second reel gear unit provided on said second reel turntable and rotated together with said second reel turntable; and a transmission mechanism for engaging with one of said first and second reel gear units and transmitting a rotational drive force from any one flywheel of said pair of flywheels, wherein said transmission mechanism comprises a mid gear to which said rotational drive force is transmitted from any one flywheel of said pair of flywheels and a single rotation detecting mechanism for detecting rotation of said mid gear and indicating a travelling motion of a tape-like recording medium in said apparatus, and said single rotation detecting mechanism includes a single reflection plate having a reflection surface divided into a plurality of pie-shaped sections and a photosensor disposed opposite to said reflection plate.

2. A tape-like recording medium travelling and driving apparatus according to claim 1, wherein an operation state of said transmission mechanism is switched based on a detection output from said rotation detecting mechanism.

3. A tape-like recording medium travelling and driving apparatus according to claim 1, further comprising a travel mode switching mechanism for switching said operation state of said transmission mechanism to transmit said rotational drive force from said flywheel to any one of said first and second reel gear units and for swinging said mid gear to transmit a rotational drive force from any other of said flywheels or said rotational drive force from said other of said flywheels.

4. A tape-like recording medium travelling and driving apparatus according to claim 3, further comprising a drive mechanism for driving said mode switching mechanism.

5. A tape-like recording medium travelling and driving apparatus according to claim 4, wherein said mode switching mechanism comprises a gear rotated by said drive mechanism and a second rotation detecting mechanism for detecting rotation of said gear.

6. A tape-like recording medium travelling and driving apparatus according to claim 5, wherein said mode switching mechanism further comprises a mode changeover lever for switching said operation state of said transmission mechanism driven by said gear and for swinging said mid gear.

7. A tape-like recording medium travelling and driving apparatus according to claim 4, further comprising a loading and ejecting mechanism for loading a tape-like recording medium onto said apparatus and ejecting same from said apparatus, wherein said gear is rotated by a first-direction rotation of a drive source of said drive mechanism and said loading and ejecting mechanism is driven by a second-direction rotation of said drive source of said drive mechanism.

8. A recording and/or reproducing apparatus employing a tape cassette housing a tape-like recording medium, comprising:

a pair of flywheels respectively rotated;

a first reel turntable engaged with one of a pair of reel hubs of a tape cassette;

a second reel turntable engaged with another of said pair of reel hubs of said tape cassette;

a first reel gear unit provided at said first reel turntable and rotated together with said first reel turntable;

a second reel gear unit provided at said second reel turntable and rotated together with said second reel turntable;

a head for recording an information signal on a tape-like recording medium accommodated in said tape cassette and for reading an information signal recorded on said tape-like recording medium, said head being moved between a standby position and a recording and/or reading position where it records an information signal recorded on said tape-like recording medium or reads an information signal recorded on said tape-like recording medium; and a transmission mechanism for transmitting a rotational drive force from any one flywheel of said pair of flywheels by engaging with any one reel gear unit of said first and second reel gear units, said transmission mechanism comprising a mid gear to which said rotational drive force from any one flywheel of said pair of flywheels is transmitted and a single rotation detecting mechanism for detecting rotation of said mid gear and indicating a travelling motion of a tape-like recording medium in said apparatus, wherein said single rotation detecting mechanism includes a single reflection plate having a reflection surface divided into a plurality of pie-shaped sections and a photosensor disposed opposite to said reflection plate, and a common belt wound around said pair of flywheels is attached to a capstan motor which rotates in one direction such that each flywheel of said pair of flywheels respectively rotates in one direction.

9. A recording and/or reproducing apparatus employing a tape cassette according to claim 8, wherein an operation state of said transmission mechanism is switched based on a detection output from said rotation detecting mechanism.

10. A recording and/or reproducing apparatus employing a tape cassette according to claim 9, wherein an operation state of said transmission mechanism is switched based on a detection output from said rotation detecting mechanism and on an output from said head.

11. A recording and/or reproducing apparatus employing a tape cassette according to claim 8, further comprising a travel mode switching mechanism for switching an operation state of said transmission mechanism to transmit said rotational drive force from said one flywheel to any one of said first and second reel gear units and for swinging said mid gear to transmit a rotational drive force from one of said flywheels or a rotational drive force from another of said flywheels.

12. A recording and/or reproducing apparatus employing a tape cassette according to claim 11, wherein said mode switching mechanism moves said head between said standby position and said recording and/or reading position in response to switching of said operation state by said transmission mechanism.

13. A recording and/or reproducing apparatus employing a tape cassette according to claim 11, further comprising a drive mechanism for driving said mode switching mechanism.

14. A recording and/or reproducing apparatus employing a tape cassette according to claim 12, wherein said mode switching mechanism comprising a gear rotated by said drive mechanism and a further rotation detecting mechanism for detecting rotation of said gear.

15. A recording and/or reproducing apparatus employing a tape cassette according to claim 14, wherein said mode switching mechanism further comprises a mode changeover lever for switching said operation state of said transmission mechanism driven by said gear and for swinging said mid gear.

16. A recording and/or reproducing apparatus employing a tape cassette according to claim 13, further comprising a loading and ejecting mechanism for loading a tape cassette onto said apparatus and ejecting same from said apparatus, wherein said gear is rotated by a first direction rotation of a drive source of said drive mechanism and said loading and ejecting mechanism is driven by a second-direction rotation of said drive source of said drive mechanism.

* * * * *